US008572584B2

(12) United States Patent
Ishizaki

(10) Patent No.: US 8,572,584 B2
(45) Date of Patent: Oct. 29, 2013

(54) CONVERTING PROGRAM CODE OF A MULTI-THREADED PROGRAM INTO PROGRAM CODE CAUSING LESS LOCK CONTENTIONS

(75) Inventor: Kazuaki Ishizaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 12/715,874

(22) Filed: Mar. 2, 2010

(65) Prior Publication Data

US 2010/0229160 A1    Sep. 9, 2010

(30) Foreign Application Priority Data

Mar. 5, 2009    (JP) .................................. 2009-52560

(51) Int. Cl.
*G06F 9/45*    (2006.01)

(52) U.S. Cl.
USPC ......................................... 717/136; 717/137

(58) Field of Classification Search
None
See application file for complete search history.

(56) References Cited

U.S. PATENT DOCUMENTS

| | | | |
|---|---|---|---|
| 6,119,115 A * | 9/2000 | Barr ...................................... | 1/1 |
| 6,735,763 B1 * | 5/2004 | Enokida ........................ | 717/143 |
| 6,757,891 B1 * | 6/2004 | Azagury et al. .............. | 717/158 |
| 6,851,114 B1 * | 2/2005 | Czajkowski ................... | 719/315 |
| 7,552,428 B2 * | 6/2009 | Stoodley et al. .............. | 717/148 |
| 7,908,256 B2 * | 3/2011 | Grcevski et al. .............. | 707/704 |
| 8,095,921 B2 * | 1/2012 | Krauss .......................... | 717/151 |
| 8,176,491 B1 * | 5/2012 | Plummer et al. .............. | 718/100 |
| 8,266,607 B2 * | 9/2012 | Burka et al. ................... | 717/154 |
| 2004/0015912 A1 * | 1/2004 | Bottomley ..................... | 717/148 |
| 2004/0162948 A1 * | 8/2004 | Tremblay et al. ............. | 711/137 |
| 2005/0289546 A1 * | 12/2005 | Shpeisman et al. ........... | 718/100 |
| 2006/0143429 A1 * | 6/2006 | Nishiyama et al. ........... | 712/209 |
| 2007/0226698 A1 * | 9/2007 | Cascaval et al. .............. | 717/127 |
| 2008/0040560 A1 * | 2/2008 | Hall et al. ...................... | 711/152 |

FOREIGN PATENT DOCUMENTS

| | | |
|---|---|---|
| JP | 2001-014173 A | 1/2001 |
| JP | 2006-185232 A | 7/2006 |
| JP | 2008-501199 A | 1/2008 |
| JP | 2008-257594 A | 10/2008 |

OTHER PUBLICATIONS

"Concurrent structures and collections in Java 5" by Neil Coffey, Jul. 7, 2008.*

(Continued)

*Primary Examiner* — Henry Tsai
*Assistant Examiner* — Jing-Yih Shyu
(74) *Attorney, Agent, or Firm* — Eustus D. Nelson; Ryan, Mason & Lewis, LLP

(57) ABSTRACT

A method, computer system, and computer readable article of manufacture for converting a first program code in a multi-threaded program into a second program code which causes less lock contention. A processing unit determines whether the first program code includes either a first class having a method call to a third class that operates while taking synchronization by locking, or a second class inheriting a parent class that operates while taking synchronization by locking. If the first class, then it is converted into a class with a method call to a concurrent operation executable class that is functionally equivalent and a shorter lock holding section. If the second class, then it is converted into a class with a method call to a concurrent operation executable class that is functionally equivalent to that of the parent class, and a shorter lock holding section.

21 Claims, 36 Drawing Sheets

(56) References Cited

OTHER PUBLICATIONS

"Efficient and Precise Datarace Detection for Multithreaded Object-Oriented Programs" by Jong-Deok Choi et al. PLDI'02, Jun. 17-19, 2002, Berlin, Germany.*

"Escape Analysis for Java" by Jong-Deok Choi et al. OOPSLA '99 1 1/99 Denver, CO, USA.*

"Java theory and practice—Building a better HashMap" by Brian Goetz, Aug. 21, 2003.*

"Java theory and practice—Characterizing thread safety" by Brian Geotz, Sep. 23, 2003.*

"Transactional Monitors for Concurrent Objects" by Adam Welc et al. M. Odersky (Ed.): ECOOP 2004, LNCS 3086, pp. 518-541, 2004.*

"Why ConcurrentHashMap is better than Hashtable and just as good as a HashMap" http://www.codercorp.com/blog/java/why-concurrenthashmap-is-better-than-hashtable-and . . . , Feb. 5, 2009.*

Brian Gortz, 'Java theory and practice: Concurrent collections classes', Jul. 23, 2003 (URL:http://www.ibm.com/developerworks/java/library/j-tp07233.html?S_TACT=105AG).

Java(TM) 2 Platform Standard Ed. 5.0, 'ConcurrentHashMap(Java 2 Platform SE 5.0)' (URL:http://java.sun.com/j2se/1.5.0/docs/api/java/util/concurrent/ConcurrentHashMap.html).

* cited by examiner

```
public class X extends Hashtable {
    private Map parent = null;
    set lockedEntries = null;

public X() {                                                    //X01
        super () ;                                                  //X02
    }                                                               //X03
    public synchronized Object get (Object key) {                   //X04
        Object ret = super.get(key);                                //X05
        if ((ret == null) && (parent != null) && (parent != this)) {  //X06
            ret = parent.get(key);                                  //X07
        }                                                           //X08
        return ret;                                                 //X09
    }                                                               //X10
    public synchronized Object put (Object p1. Object p2) {         //X11
        if (lockedEntries != null && lockedEntries.contains(p1)) {  //X12
            return null;                                            //X13
        }                                                           //X14
        if (lockedEntries == null) {                                //X15
            lockedEntries = new HashSet() ;                         //X16
        }                                                           //X17
        lockedEntries.add(p1);                                      //X18
        return super.put(p1, p2);                                   //X19
    }                                                               //X20
    public synchronized void clear () {                             //X21
        super.clear()                                               //X22
        lockedEntries = null;                                       //X23
    }                                                               //X24
}
```

FIG. 4B

```
public class X extends Hashtable {
    private Map parent = null ;
    set lockedEntries = null ;
    private concurrentHashtable cc = new concurrentHashtable();   //X'00
    public X() {                                                   //X'01
        //super () ;                                                //X'02
    }                                                              //X'03
    public Object get (Object key) {                               //X'04
        Object ret = cc.get(key) ;                                 //X'05
        if (ret == null) {                                         //X'06
            synchronized (this)   {
                ret = cc.get(key);
                if (ret == null)    {
                    if ((parent != null) && (parent != this)) {
                        ret = parent.get(key);                     //X'07
                    }
                }
            }
        }                                                          //X'08
        return ret ;                                               //X'09
    }                                                              //X'10
    public Object synchronized put (Object p1. Object p2) {        //X'11
        if (lockedEntries != null && lockedEntries.contains(p1)) { //X'12
            return null ;                                          //X'13
        }                                                          //X'14
        if (lockedEntries == null) {                               //X'15
            lockedEntries = new HashSet() ;                        //X'16
        }                                                          //X'17
        lockedEntries.add(p1) ;                                    //X'18
        return cc.put(p1, p2) ;                                    //X'19
    }                                                              //X'20
    public void synchronized clear () {                            //X'21
        cc.clear()                                                 //X'22
        lockedEntries = null ;                                     //X'23
    }                                                              //X'24
}
```

FIG. 4C

```
public class Y {
    private Map sc = Collections. synchronizedMap(new HashMap()) ;    //Y00
    public Y() {                                                      //Y01
    }                                                                 //Y02
    public Object pop() {                                             //Y03
        Thread thread = Thread.currentThread() ;                      //Y04
        List stack = (List)sc.get(thread) ;                           //Y05
        return stack.get(stack.size() - 1) ;                          //Y06
    }                                                                 //Y07
    public void push (Object val) {                                   //Y08
        Thread thread = Thread.currentThread() ;                      //Y09
        List stack = (List)sc.get(thread) ;                           //Y10
        if (stack == null) {                                          //Y11
            stack = new ArrayList() ;                                 //Y12
            sc.put(thread, stack) ;                                   //Y13
        }                                                             //Y14
        stack.add(val) ;                                              //Y15
    }                                                                 //Y16
}
```

FIG. 6A

```
public class Y {
    ThreadLocal tlh = new ThreadLocal() ;       //Y'00 public Y() {                                //Y'01
    }                                           //X'02
    public Object pop () {                      //Y'03
        List stack = (List)tlh.get();           //Y'05
        return stack.get(stack.size() - 1) ;    //Y'06
    }                                           //Y'07
    public void push (Object val) {             //Y'08
        List stack = (List)tlh.get() ;          //Y'10
        if (stack == null) {                    //Y'11
            stack = new ArrayList() ;           //Y'12
            tlh.put (stack) ;                   //Y'13
        }                                       //Y'14
        stack.add(val) ;                        //Y'15
    }                                           //Y'16
}
```

FIG. 6B

```
public class Z {
    private Hashtable ht = new Hashtable();                              //Z01 public void synchronized put (Object key, Object value)  {           //Z02
        ht.put (key, value) ;                                            //Z03
    }
                                                                         //Z04
    public Enumeration<?> keys () {                                      //Z05
        ConcurrentHashMap h = new ConcurrentHashMap() ;                  //Z06
        synchronized (this) {                                            //Z07
            for (Enumeration e = ht.keys() ; e.hasMoreElements() ;) {    //Z08
                String key = (String)e.nextElement() ;                   //Z09
                h.put(key, ht.get(key));                                 //Z10
            }                                                            //Z11
        }                                                                //Z12
        return h.keys() ;                                                //Z13
    }
                                                                         //X14
    public Object get(Object key) {                                      //Z15
        ht.get(key) ;                                                    //Z16
    }                                                                    //Z17
}
```

FIG. 8B

```
public class Z {
    private ConcurrentMap ht = new ConcurrentMap() ;                      //Z'01
    private ReentrantReadWriteLock rwl = new ReentrantReadWriteLock() ;
    private Lock rl = rwl. readLock() ;
    private Lock wl = rwl. writeLock() ;

public void put(Object key, Object value) {                           //Z'02
        wl. lock() ; {
            ht.put(key. value) ;                                          //Z'03
        } wl. unlock() ;
    }                                                                     //Z'04
    public Enumeration<?> keys () {                                       //Z'05
        ConcurrentHashMap h = new ConcurrentHashMap () ;                  //Z'06
        rl. lock() ; {
            for (Enumeration e = ht.keys() ; e.hasMoreElements() ;) {     //Z'08
                String key = (String)e.nextElement() ;                    //Z'09
                h.put(key. ht.get(key)) ;                                 //Z'10
            }                                                             //Z'11
        } rl.unlock() ;
        return h.keys() ;                                                 //Z'13
    }                                                                     //Z'14
    public Object get (Object key) {                                      //Z'15
        ht.get(key)                                                       //Z'16
    }                                                                     //Z'17
}
```

FIG. 8C

|  | THROUGHPUT | CPU USAGE | PERFORMANCE IMPROVEMENT RATE |
|---|---|---|---|
| BEFORE APPLICATION OF EMBODIMENT OF INVENTION | 2360.7 | 58.3% | 1 |
| AFTER APPLICATION OF EMBODIMENT OF INVENTION | 2647.3 | 96.6% | 1.55 |

FIG. 9

CONVERTING PROGRAM CODE OF A MULTI-THREADED PROGRAM INTO PROGRAM CODE CAUSING LESS LOCK CONTENTIONS

CROSS-REFERENCE TO RELATED APPLICATIONS

This application claims priority under 35 U.S.C. §119 from Japanese Patent Application No. 2009-52560 filed Mar. 5, 2009, the entire contents of which are incorporated herein by reference.

TECHNICAL FIELD OF THE INVENTION

The present invention relates to a method of converting program code of a multi-threaded program into program code causing less lock contentions, and a computer program and a computer system of the same.

BACKGROUND OF THE INVENTION

In recent years, the processor architecture has been shifting to the so-called multi-core processor architecture in which a central processing unit (hereinafter, abbreviated as CPU) includes multiple CPU cores packaged onto a single chip. A multi-core CPU is a single CPU when viewed from outside, but is internally regarded as multiple CPUs. Thus, in an environment where a CPU is mainly involved in concurrent processing, the CPU chip as a whole is able to achieve improved performance by enhancing its overall processing capacity. The multi-core processor architecture allows a tremendous increase in the number of hardware threads simultaneously executable by a single processor.

When a conventional program is executed on a processor capable of simultaneously executing multiple threads as described above, the processor has a problem of performance deterioration due to lock contentions. A lock contention mentioned here indicates a state where, when a certain thread acquires a lock in entering a critical section that needs to be exclusively executed, another thread cannot go into the next step until the lock is released. Such a thread that cannot go into the next step usually goes into a spin loop or a sleep state.

There are various factors for causing a lock contention. One of the factors is that program code uses a so-called collection class (hereinafter, referred to as "synchronized collection class"), in which the program code operates while acquiring and releasing a lock to exclusively execute a thread. For example, such program code is code belonging to such synchronized collection class, and involving access to a map class (hereinafter, referred to as "synchronized map class") for mapping a predetermined key to a certain value. The program code uses an instance object of the synchronized map class to lock all the methods included in the synchronized map class. For this reason, when multiple threads accesses the same synchronized map class, lock contentions occur frequently. Once a lock contention occurs, the processor is allowed to execute only one thread at one time. In this way, the lock contention poses a scalability problem in performance of the processor.

Brian Gortz, "Java theory and practice: Concurrent collections classes," shows that a Hashtable class as an example of the aforementioned synchronized collection class can be replaced with a ConcurrentHashMap class which enables concurrent operations by minimizing synchronization. For more detailed description of the ConcurrentHashMap class, please see Java™ 2 Platform Standard Ed. 5.0, "ConcurrentHashMap (Java 2 Platform SE 5.0)."

When "Hashtable" in code is simply replaced with "ConcurrentHashMap" by using a replace function of an editor in order to change from the Hashtable class to the ConcurrentHashMap class, such replacement cannot reduce any lock contentions in the following cases: (1) methods in a synchronized map class are enclosed in a synchronized block; (2) a class inherits a Hashtable class (java.util.Hashtable); and (3) a key of the synchronized map class is used as a thread specific value.

Whenever program code causes a problem in performance deterioration due to a lock contention, the program code needs to be corrected manually by identify the factor of the lock contention. However, doing such a correction work is almost impossible because a huge amount of workload is needed due to a large amount of the program code currently existing. For this reason, there is needed a method of automatically identifying and correcting in advance a section where the foregoing problem is likely to occur. In addition, for changing from a Hashtable class to a ConcurrentHashMap class, it is necessary to prepare an algorithm which enables automatic replacement with a synchronized map class while avoiding the problem of the lock contention.

SUMMARY OF THE INVENTION

Accordingly, a first aspect of the present invention provides a method of converting a first program code in a multi-threaded program into a second program code which causes less lock contention. The first program code is loaded from a storage unit into a memory using a processing unit. The processing unit determines whether the first program code includes either (i) a first class having a method call to a class that operates while taking synchronization by locking, or (ii) a second class inheriting a parent class that operates while taking synchronization by locking. In response to the determination that the first program code includes the first class, the processing unit converts the first class having the method call to a third class that operates while taking synchronization by locking, into a class having a first method call to a concurrent operation executable fourth class that has a functionality equivalent to that of the third class, and having a shorter lock holding section than the third class. In response to the determination that the first program code includes the second class, the processing unit converts the second class having a method call to the parent class, into a class having a second method call to a concurrent operation executable class that has a functionality equivalent to that of the parent class, and having a shorter lock holding section than the second class.

A second aspect of the present invention provides a computer system for executing a conversion computer program for converting a first program code in a multi-threaded program into a second program code which causes less lock contention. The computer system includes a storage unit in which the first program code and the conversion computer program are stored and a central processing unit (CPU) configured for loading the computer program from the storage unit into a memory, determining whether the first program code includes either (i) a first class having a method call to a class that operates while taking synchronization by locking, or (ii) a second class inheriting a parent class that operates while taking synchronization by locking, converting the first class having the method call to a third class that operates while taking synchronization by locking into a class having a first method call to a concurrent operation executable fourth class that has a functionality equivalent to that of the third class and having a shorter lock holding section than the third class, and converting the second class having a method call to the parent class into a class having a second method call to a concurrent operation executable class that has a functionality equivalent to that of the parent class and having a shorter lock holding section than the second class.

A third aspect of the present invention provides a computer readable article of manufacture tangibly embodying computer readable instructions which when executed causes a computer to carry out the steps of the method for controlling data described above.

BRIEF DESCRIPTION OF THE DRAWINGS

FIG. 3C shows a detailed flow of the processing in step 304 in FIG. 3A according to the embodiment of the present invention.

FIG. 3D shows a detailed flow of the processing in step 304 in FIG. 3A according to the embodiment of the present invention.

FIG. 3E shows a detailed flow of the processing in step 304 in FIG. 3A according to the embodiment of the present invention.

FIG. 4B shows a CL (class X) that is the first Java code (108) in the memory (102) shown in FIG. 1 according to the embodiment of the present invention.

FIG. 4C shows a CL (class X) that is the second Java code (110) in the memory (102) shown in FIG. 1 according to the embodiment of the present invention.

FIG. 6A shows a CL (class Y) that is the first Java code (108) in the memory (102) shown in FIG. 1 according to the embodiment of the present invention.

FIG. 6B shows a CL (class Y) that is the second Java code (110) in the memory (102) shown in FIG. 1 according to the embodiment of the present invention.

FIG. 8B shows a CL (class Z) that is the first Java code (108) before conversion in the memory (102) shown in FIG. 1 according to the embodiment of the present invention.

FIG. 8C shows a CL (class Z) that is the second Java code (110) after conversion in the memory shown in FIG. 1 according to the embodiment of the present invention.

FIG. 9 shows an example of performance comparison between programs before and after the application of code conversion according to the embodiment of the present invention.

DETAILED DESCRIPTION OF THE PREFERRED EMBODIMENTS

Figure 1:
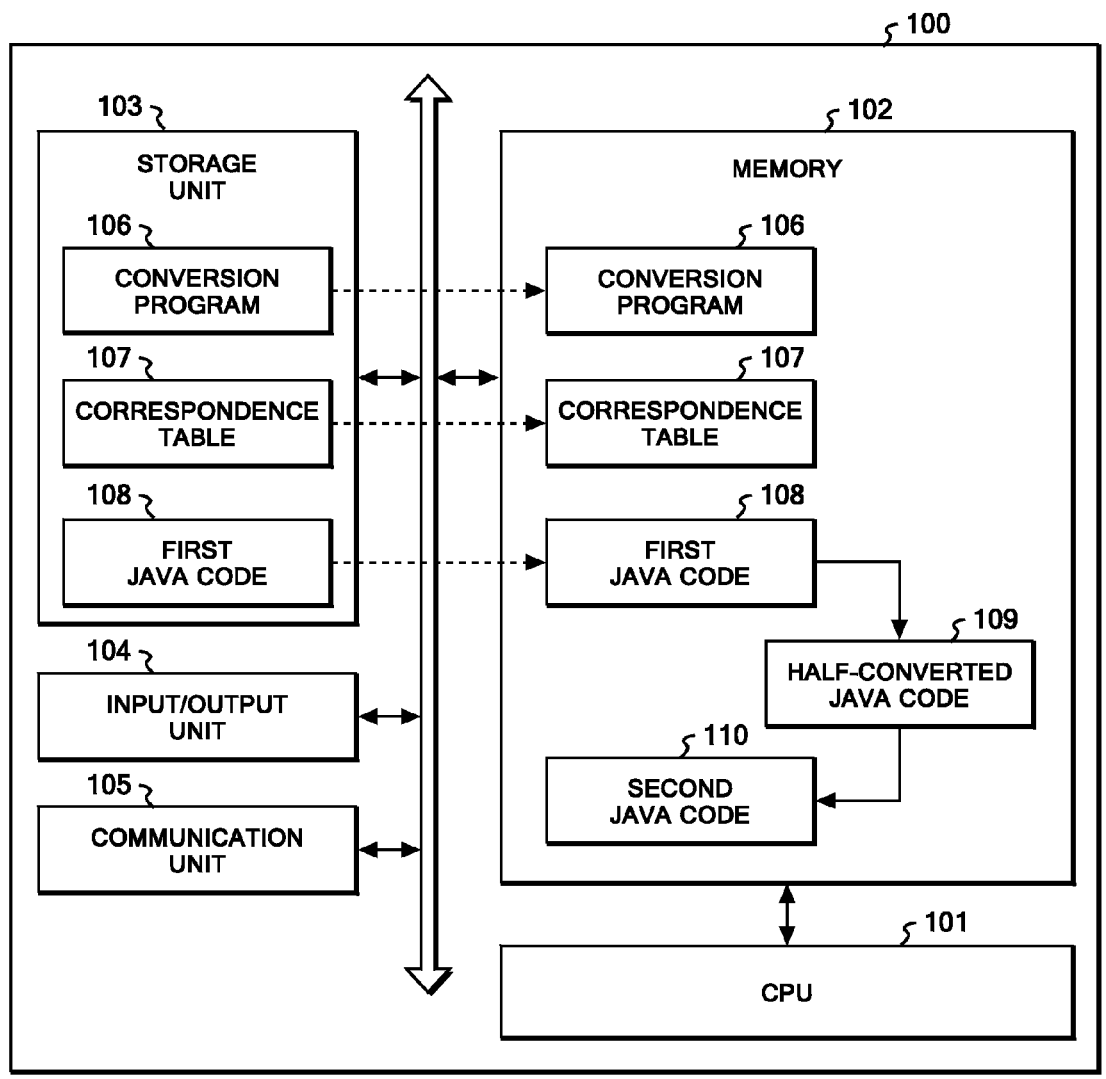
FIG. 1 shows a functional block diagram illustrating functions held by a program code converting system according to the embodiment of the present invention.

Hereinafter, terms and phrases used in this description and the scope of claims are explained.

In embodiments of the present invention, "program code in a multi-threaded program" is source code of a program which can concurrently execute multiple processing operations by generating multiple processing units called threads and by assigning a CPU time to each thread. The source code is described in the Java (trademark) language or the C language (for instance, C++), for example.

In the embodiments of the present invention, "take synchronization by locking" is that the processing running on a thread performs exclusive control by acquiring or releasing a lock, when entering the critical section and then reading and writing shared data. The critical section is a section where a failure occurs if multiple processing operations are executed simultaneously on a single resource.

In the embodiments of the present invention, "a lock contention" indicates a state where, when the processing running on a certain thread enters a critical section and acquires a lock for reading and writing shared data, the processing running on another thread fails to acquire the lock and is kept in a wait state until the lock is released.

In the embodiments of the present invention, "less lock contentions" indicates both a case where the frequency of lock contentions itself is reduced, and a case where, even when a lock contention occurs, the thread requires such a short time period from lock acquisition to lock release that a lock waiting time of another thread, i.e., the duration of the lock contention can be reduced. The case where the frequency of lock contentions itself is reduced includes a case where modification or the like of a data structure of the program code makes concurrent operations executable without using the lock mechanism. The reduction in the time period from lock acquisition to lock release even if a lock contention occurs is also called a reduction in a lock scope.

In the embodiments of the present invention, a "class operating while taking synchronization by locking" is a class or an interface (hereinafter, called a class for simplification of the description) that accesses data while taking synchronization by acquiring and releasing a lock. In the embodiment of the present invention, a synchronized map class denotes one type of such class implementing a map interface (which associates a key with at most a single value (mapping)). A specific example of the synchronized map class is a map class (java.util.Map) wrapped in a Hashtable class (java.util.Hashtable) or a synchronized map method of the collections class (java.util.Collections.synchronizedMap( )).

In the embodiments of the present invention, a "concurrent operation executable class" is a class that has the same functionality as a class operating while taking synchronization by locking, and that is concurrently executable because of needing to acquire and hold a lock only within a shorter section than the class operating while taking synchronization by locking. The "concurrent operation executable class" is prepared in advance in a class library, for example.

The phrase "concurrent operation executable" means that multiple threads can be safely executed while causing less lock contentions. More specifically, the "concurrent operation executable" situation means that lock contentions occur less frequently between a retrieval operation such as method get( ), an update operation such as method put( ) or method remove( ), and a tabulation operation such as method putAll or method clear( ); and that an exception such as ConcurrentModificationException does not occur while an interface Iterators/Enumerations is performing an iteration/enumeration operation without locking. The concurrent operation executable class can be a ConcurrentHashMap class (java.util.concurrent.ConcurrentHashMap) corresponding to a Hashtable class, and a concurrent map class corresponding to a synchronized map class, for example. Incidentally, whereas the concurrent map class includes the definition of a specific method such as clone( ) method, the ConcurrentHashMap class does not include the definition of such specific method.

In the embodiments of the present invention, "a lock holding section" represents a part of code from a command to acquire a lock to a command to release the lock. Such lock holding section is a part of code enclosed in a synchronized block, for example.

Hereinafter, the embodiments of the present invention will be described with reference to the drawings. It should be noted that embodiments described herein are intended only to explain the present invention, and not to limit the scope of the present invention to the description provided below. Throughout the drawings, the same reference numerals represent the same elements unless otherwise stated.

According to an embodiment of the present invention, program code to access a class that takes synchronization by locking is automatically converted into program code to access a concurrent operation executable class having a shorter lock holding section than the class that takes synchronization by locking. Moreover, this conversion automatically narrows a section locked by a synchronized block on the program code. The conversion reduces a time of lock contention during execution of the program code, and prevents deterioration of the efficiency of a CPU running on a multi-threaded environment.

FIG. 1 shows a functional block diagram illustrating functions held by a program code converting system according to an embodiment of the present invention. A computer system (100) typically includes a CPU (101), a memory (102), and a storage unit (103). The computer system (100) may also include an input/output unit (104) and a communication unit (105). The computer system (100) includes, in the storage unit (103), a conversion program (106), first Java code (108) and a correspondence table (107) according to the present invention. The conversion program (106) is a program for converting Java code, the first Java code is a Java code example of a program to be converted in accordance with the conversion program, and the correspondence table (107) is a table to which reference is made during the conversion. The following description is provided by taking an example a case where a program to be converted in accordance with the conversion program is of Java code. However, the present invention is also applicable to other types of programs in a similar manner. The first Java code (108) may be stored in the storage unit (103) through the input/output unit (104) or from the communication unit (105) via a network. The CPU (101) loads the conversion program (106) into the memory (102) from the storage unit (103). The CPU (101) executes commands of the conversion program (106), reads the first Java code (108) and the correspondence table (107) into the memory (102), converts the read first Java code (108) into Java code (110) (called second Java code below) having less lock contentions. The first Java code (108) may be converted into the second Java code (110) after being firstly converted into half-converted Java code (109).

In the embodiment of the present invention, in the case where a synchronized map class is used in the first Java code (108), the computer system (100) automatically replaces the synchronized map class with a concurrent map class corresponding to the synchronized map class by using a correspondence prepared in advance in the correspondence table (107) and/or the conversion program (106). Such replacement reduces lock contentions during the execution of the Java code. The correspondence table (107) is a table in which correspondences between synchronized map classes and the concurrent map classes are stored. The correspondence table (107) stores each pair of an application program interface (API) of a synchronized map class and an API of a concurrent map class that is a concurrent operation executable API providing the same functionality as the API of the synchronized map class and having a shorter lock holding section than the API of the synchronized map class. If an API of the synchronized map class is used in the first Java code (108), the computer system (100) finds an API of the concurrent map class forming a pair with the API of the synchronized map class, in reference to the correspondence table (107). Thereby, the computer system (100) can replace the API of the synchronized map class with the found API of the concurrent map class.

The aforementioned replacement can be made in the case where the first Java code (108) includes any one of the following three classes.

First, a class using a synchronized map class.

Second, a class inheriting a collection class in which to take synchronization is specified. The collection class in which to take synchronization is specified is, for example, the synchronized Hashtable class (java.util.Hashtable) of the Java class library, the synchronized vector class (java.util.Vector) of the Java class library, and the synchronized stack class (java.util.Stack) of the Java class library.

Third, a class using a thread-specific value as a key of a synchronized map class.

In this description, the embodiment is explained based on the assumption that the collection class in which to take synchronization is specified is the synchronized Hashtable class, and that the concurrent map class corresponding to the synchronized Hashtable class is a concurrentHashtable class.

Accordingly, an embodiment using a class inheriting a synchronized Hashtable class (step 202 in FIG. 2 and all the steps in FIGS. 3A to 3I) is also implementable on a class inheriting a collection class in which to take synchronization is specified.

Figure 2:
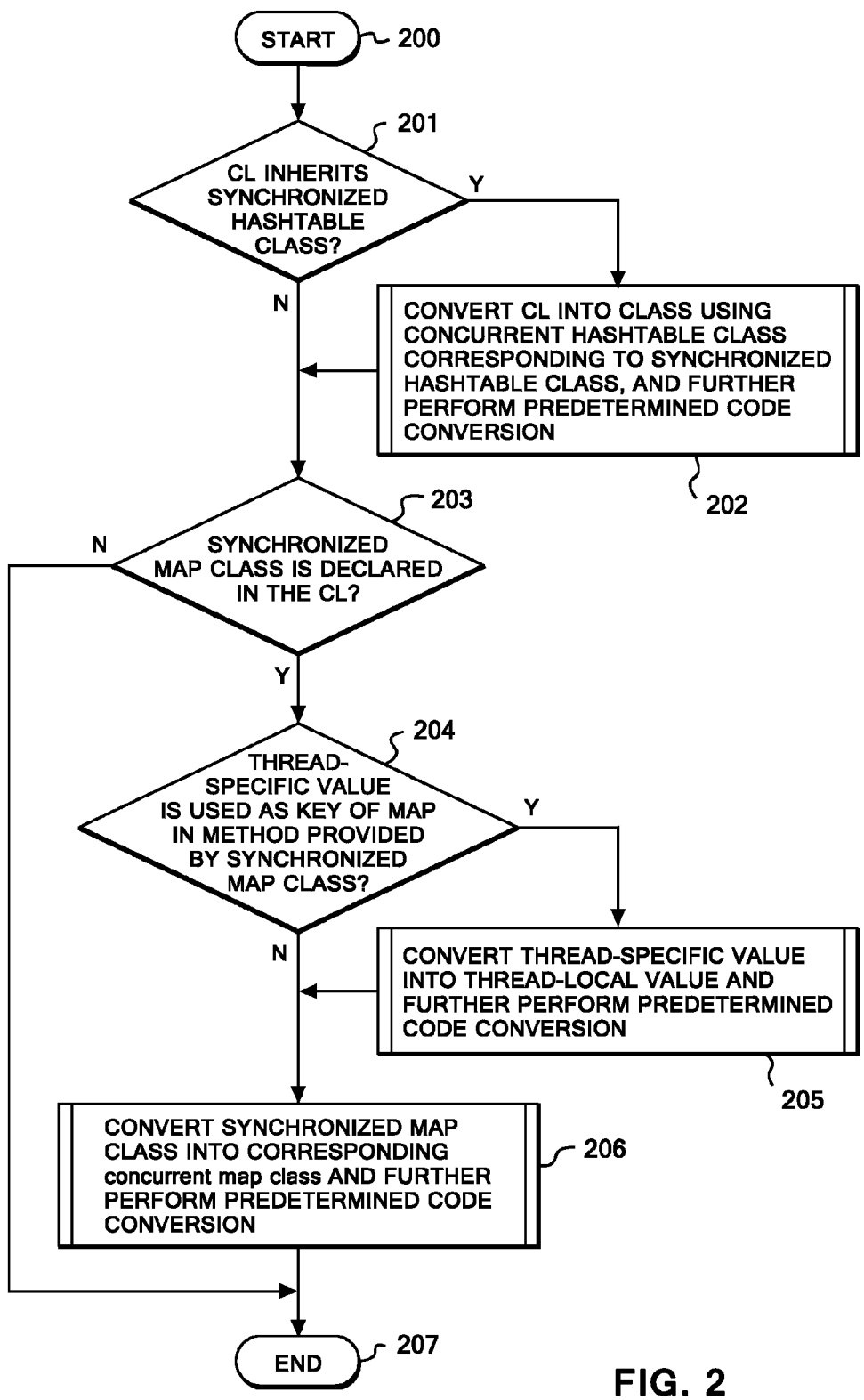
FIG. 2 shows an outline of processing flow according to the embodiment of the present invention for converting first Java code in a memory into second Java code as shown in FIG. 1.

FIG. 2 shows an outline of processing flow according to the embodiment of the present invention for converting the first Java code (108) in the memory (102) into the second Java code (110) as shown in FIG. 1.

Prior to the start of the conversion processing, the computer system (100 in FIG. 1) loads the first Java code (108), which is a program written in the programming language Java, from the storage unit (103 in FIG. 1) into the memory (102 in FIG. 1). The following explanation is based on the assumption that the first Java code (108) includes only one class (abbreviated as CL, below), but the first Java code (108) may include two or more classes. If the first Java code (108) includes two or more classes, the computer system (100) executes the undermentioned processing of steps 200 to 207 for all the classes one by one.

Step 200 is the start of the conversion processing.

In step 201, the computer system (100) determines whether the class (CL) included in the inputted first Java code (108) inherits a synchronized Hashtable class. In the determination, the computer system (100) checks whether the class declaration part in the CL includes "extends hashtable." If "extends hashtable" is included, the computer system (100) determines that the CL inherits the synchronized Hashtable class, and the processing goes to step 202. On the other hand, if "extends hashtable" is not included, the computer system (100) determines that the CL does not inherit the synchronized Hashtable class, and the processing goes to step 203.

In step 202, the computer system (100) converts the CL into a class using the concurrent Hashtable class corresponding to the synchronized Hashtable class. Specifically, the computer system (100) adds, to the CL, new code to generate a new instance of the concurrent Hashtable class corresponding to the synchronized Hashtable class. Then, the computer system (100) replaces code to call a method belonging to the synchronized Hashtable class, which is a super class of the CL, with code to call a method belonging to the newly created instance of the concurrent Hashtable class. After that, the computer system (100) performs predetermined code conversion. In this code conversion, the computer system (100) converts the code included in the CL into predetermined code if the replaced code satisfies a given condition. In the conversion, the computer system (100) deletes unnecessary code for synchronization from the CL, for example. The processing in step 202 will be explained later in more detail in the description of FIGS. 3A to 3J. Thereafter, the processing goes to step 203.

In step 203, the computer system (100) determines whether the synchronized map class is declared in the CL. If the synchronized map class is declared in the CL, the processing goes to step 204. If the synchronized map class is not declared in the CL, the processing is terminated.

In step 204, the computer system (100) performs the following determination processing. Specifically, the computer system (100) determines whether a thread-specific value is used as a key of a map in a method provided by the synchronized map class declared in the CL. The key of the map mentioned herein is a key value specified, as a set, together with a value when the value is registered into a map class. By designating the same key value as that specified in the registration, the computer system (100) can retrieve the value registered in association with the key value. The thread-specific value is, for example, a method (java.lang.Thread.currentThread( ) or java.lang.Thread.getId( )) of a thread class. When the thread-specific value is used, the processing goes to step 205. If not, the processing goes to step 206.

In step 205, the computer system (100) converts the thread-specific value into a thread-local value. More specifically, the computer system (100) adds to the CL code to reserve a thread local storage. Then, the computer system (100) replaces code to access the synchronized map class, with code to access the thread local storage. After that, the computer system (100) performs predetermined code conversion. In this code conversion, the computer system (100) converts the code included in the CL into predetermined code if the replaced code satisfies a given condition. The processing in step 205 will be explained later in more detail in the description of FIGS. 5A to 5F. Thereafter, the processing goes to step 206.

In step 206, the computer system (100) converts the synchronized map class into the corresponding concurrent map class. After that, the computer system (100) performs predetermined code conversion. In this code conversion, the computer system (100) converts the code included in the converted class into predetermined code if the converted class satisfies given conditions. In the conversion, the computer system (100) searches the CL to find code that can be rewritten to reduce lock contentions during the execution, and then rewrites the found code, for example. The processing in step 206 will be explained later in more detail in the description of FIGS. 7A to 7J. After the rewriting, the computer system (100) terminates the processing.

Step 207 is the end of the conversion processing.

Figure 3A:
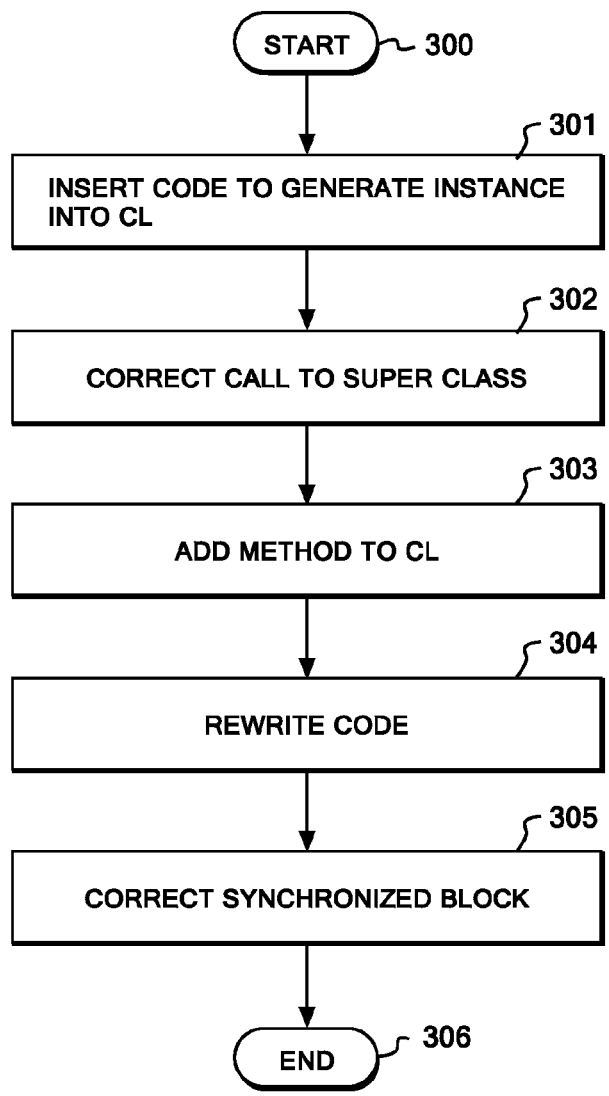
FIG. 3A shows a detailed flow of the processing in step 202 in FIG. 2 according to the embodiment of the present invention.

FIG. 3A shows a detailed flow of the processing in step 202 in FIG. 2 according to the embodiment of the present invention.

Step 202 in FIG. 2 is the processing of converting the class inheriting the synchronized Hashtable class into the class using the concurrent Hashtable class corresponding to the synchronized Hashtable class.

Step 300 is the start of step 202 in FIG. 2.

In step 301, the computer system (100) inserts into the CL code to generate an instance of the concurrent Hashtable class.

In the following example, cc denotes a private variable to which the created instance of the concurrent Hashtable class is assigned. The code thus inserted is, for example, "private concurrentHashtable cc=new concurrentHashtable( );". Upon completion of this insertion, the processing goes to step 302.

In step 302, the computer system (100) corrects the CL, more specifically, corrects a call to the super class inherited by the CL. The computer system (100) replaces a method call to a super class method belonging to the synchronized Hashtable class, which is the super class of the CL, and being written in the form of "super.foo( )", with a call "cc.foo( )" to the instance of the concurrent Hashtable class. Here, foo( ) denotes a method name of any type. The computer system (100) replaces "super.get(key)" with "cc.get(key)," for example. Further, the computer system (100) deletes "super( )", which is a super class call in the constructor of the class, from the CL. Upon completion of the replacement and deletion, the processing goes to step 303.

In step 303, the computer system (100) adds a method to the CL. The method thus added is a method that belongs to the synchronized Hashtable class and is not originally defined in the CL.

A user stores an API of the synchronized Hashtable class in a file, for example. From this file, the computer system (100) acquires an interface for accessing a method of the synchronized Hashtable class, and the signature of the method of the synchronized Hashtable class. The computer system (100) checks the CL to find whether the interface thus acquired is included in the CL. If the CL does not includes the same interface as the acquired interface, the computer system (100) adds to the CL the definition of a method to provide the interface. The computer system (100) sets the added method to have the same signature as the method of the synchronized Hashtable class which is acquired from the file and corresponds to the added method. In addition, the computer system (100) implements the added method as "return cc.foo( );". At this time, however, if the return value of the method of the synchronized Hashtable class corresponding to the added method is void, the computer system (100) implements the added method as "cc.foo( );". Here, foo( ) is a method of the synchronized Hashtable class corresponding to the added method.

In step 304, the computer system (100) rewrites the code in the CL. The computer system (100) overwrites code including the replaced method call in step 302 (hereinafter, referred to as first code), with code to atomically execute lock acquisition and lock release (hereinafter, referred to as second code). This rewriting will be described later with reference to FIGS. 3B to 3E.

In step 305, the computer system (100) corrects a synchronized block included in the CL. When the method call with which the method call to the super class is replaced in step 302 is enclosed in a synchronized block, the computer system (100) corrects the synchronized block. This correction will be described later with reference to FIGS. 3F to 3J.

Note that the steps in FIG. 3A may be executed in any order as long as the following conditions are satisfied: step 305 is executed after step 301; step 302 is executed after step 301; step 303 is executed after step 302; and step 304 is executed after step 302.

Here, if step 304 is executed before step 303, the opportunities of rewriting the code may be reduced as compared with the case where step 304 is executed after step 303.

Each of FIGS. 3B to 3E shows a detailed flow of the processing in step 304 in FIG. 3A according to the embodiment of the present invention.

In the following example, an "if statement" is used as a conditional expression. A usable conditional expression, however, is not limited to an "if statement", and may include any reserved word prepared in a used language for determination of condition. For example, a Switch statement may be also used.

Figure 3B:
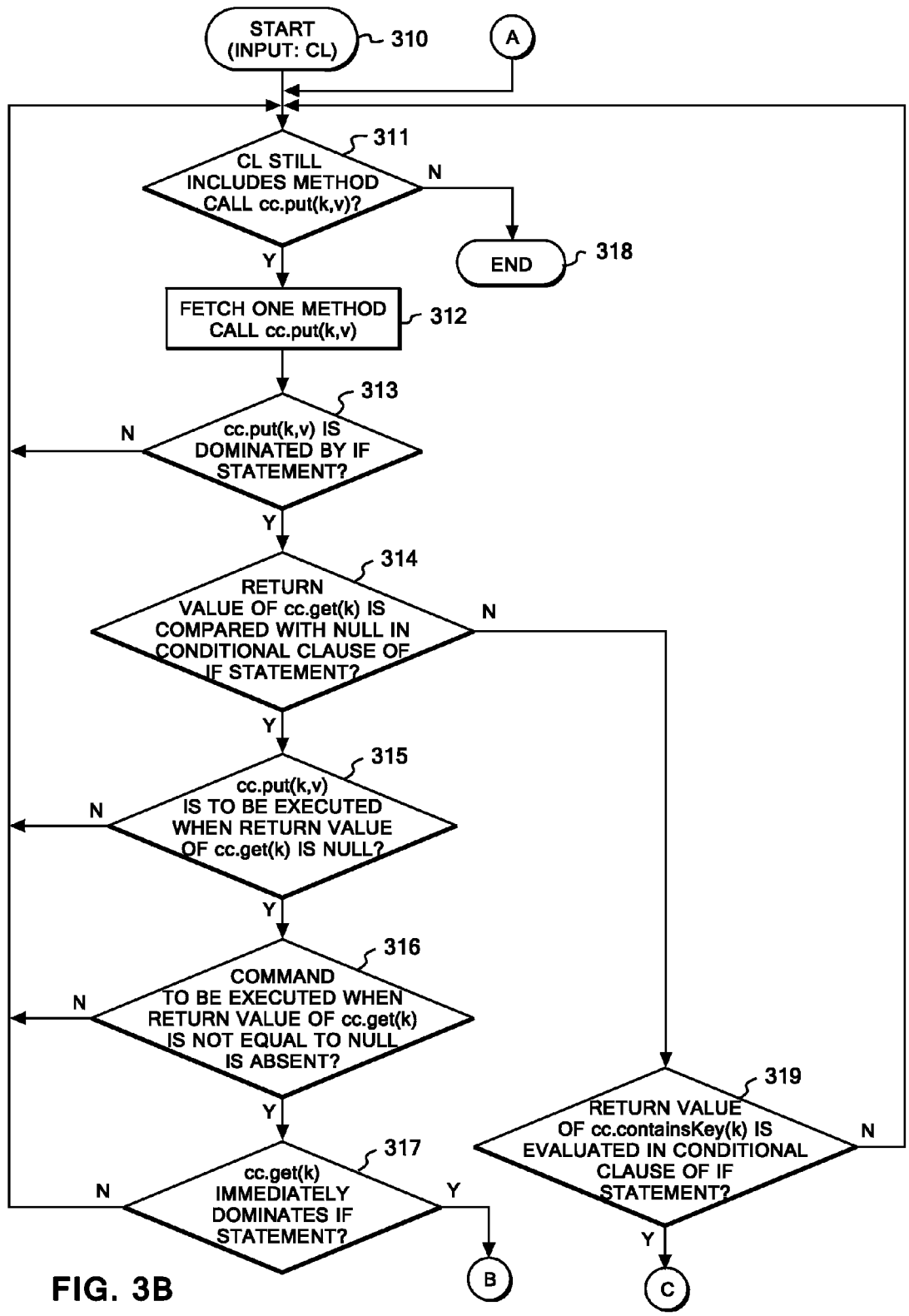
FIG. 3B to 3E shows a detailed flow of the processing in step 304 in FIG. 3A according to the embodiment of the present invention.

Hereinafter, steps 310 to 319 in FIG. 3B will be described.

Step 310 is the start of step 304 in FIG. 3A.

In step 311, the computer system (100) determines whether the CL includes a method call cc.put(k,v). The method put(k, v) is a method to store a value corresponding to a key value in the table of the concurrent Hashtable class while specifying the key value. Here, k denotes a certain variable in which a key value is to be stored, and v denotes a certain variable in which a value corresponding to the key value is to be stored. The method call cc.put(k,v) to be determined as included or not included is cc.put(k,v) yet to be taken out in the following step 312. If the CL includes cc.put(k,v), the processing goes to step 312. On the other hand, if the CL does not include cc.put(k,v), the processing goes to step 318 and then is terminated.

In step 313, the computer system (100) determines whether the above cc.put(k,v) is dominated by an "if statement". The situation in which cc.put(k,v) is dominated by an 'if statement' is that cc.put(k,v) is included in a part of code selectively controlled by the 'if statement'. When cc.put(k,v) is dominated by an 'if statement', the processing goes to step

314. On the other hand, when cc.put(k,v) is not dominated by an 'if statement', the processing turns back to step 311, and the processing for another cc.put(k,v) is started.

In step 314, the computer system (100) determines whether the return value of cc.get(k) is compared with null in the conditional clause of the 'if statement'. Here, the method get(k) is a method to retrieve a value corresponding to a key value k from the table of the concurrent Hashtable class while specifying the key value k. The situation in which the return value of cc.get(k) is compared with null is that "cc.get(k)==NULL", for example, is described in the conditional clause. When the return value of cc.get(k) is compared with null, the processing goes to step 315. Instead, when the return value of cc.get(k) is not compared with null, the processing goes to step 319.

In step 315, the computer system (100) determines whether cc.put(k,v) is to be executed when the return value of cc.get(k) is null. The situation in which cc.put(k,v) is to be executed if the return value is null is that the 'if statement' is "if(cc.get(k)==NULL){v=cc.put(k,v);}", for example. If cc.put(k,v) is to be executed, the processing goes to step 316. On the other hand, if cc.put(k,v) is not to be executed, the processing turns back to step 311, and the processing for another cc.put(k,v) is started.

In step 316, the computer system (100) determines whether there is absence of any command to be executed when the return value of cc.get(k) is not equal to null. The situation in which there is absence of any command to be executed if the return value is not equal to null is that the 'if statement' is "if(cc.get(k)==NULL){v=cc.put(k,v);}else{//nop}", for example. If a command to be executed is absent, the processing goes to step 317. On the other hand, if a command to be executed is not absent, the processing turns back to step 311, and the processing for another cc.put(k,v) is started.

In step 317, the computer system (100) determines whether cc.get(k) immediately dominates an 'if statement'. The situation in which cc.get(k) immediately dominates an 'if statement' is that cc.get(k) is executed, without fail, before the execution of the 'if statement', and where there is not any command to be executed, without fail, between the execution of cc.get(k) and the execution of the 'if statement'. If cc.get(k) immediately dominates the 'if statement', the processing goes to step 321. On the other hand, if cc.get(k) does not immediately dominate the 'if statement', the processing goes to step 311, and the processing for another cc.put(k,v) is started.

In step 319, the computer system (100) determines whether the return value of cc.containsKey(k) is evaluated in the conditional clause of an 'if statement'. The situation in which the return value of cc.containsKey(k) is evaluated is that "cc.containsKey(k)==FALSE", for example, is written in the conditional clause. Here, the method containsKey(k) is a method to return a value indicating whether a value corresponding to a key value k is included in the concurrent Hashtable class, while specifying the key value k. If the return value of cc.containsKey(k) is evaluated, the processing goes to step 331. Instead, if the return value is not evaluated, the processing turns back to step 311, and the processing for another cc.put(k,v) is started.

Figure 3C:
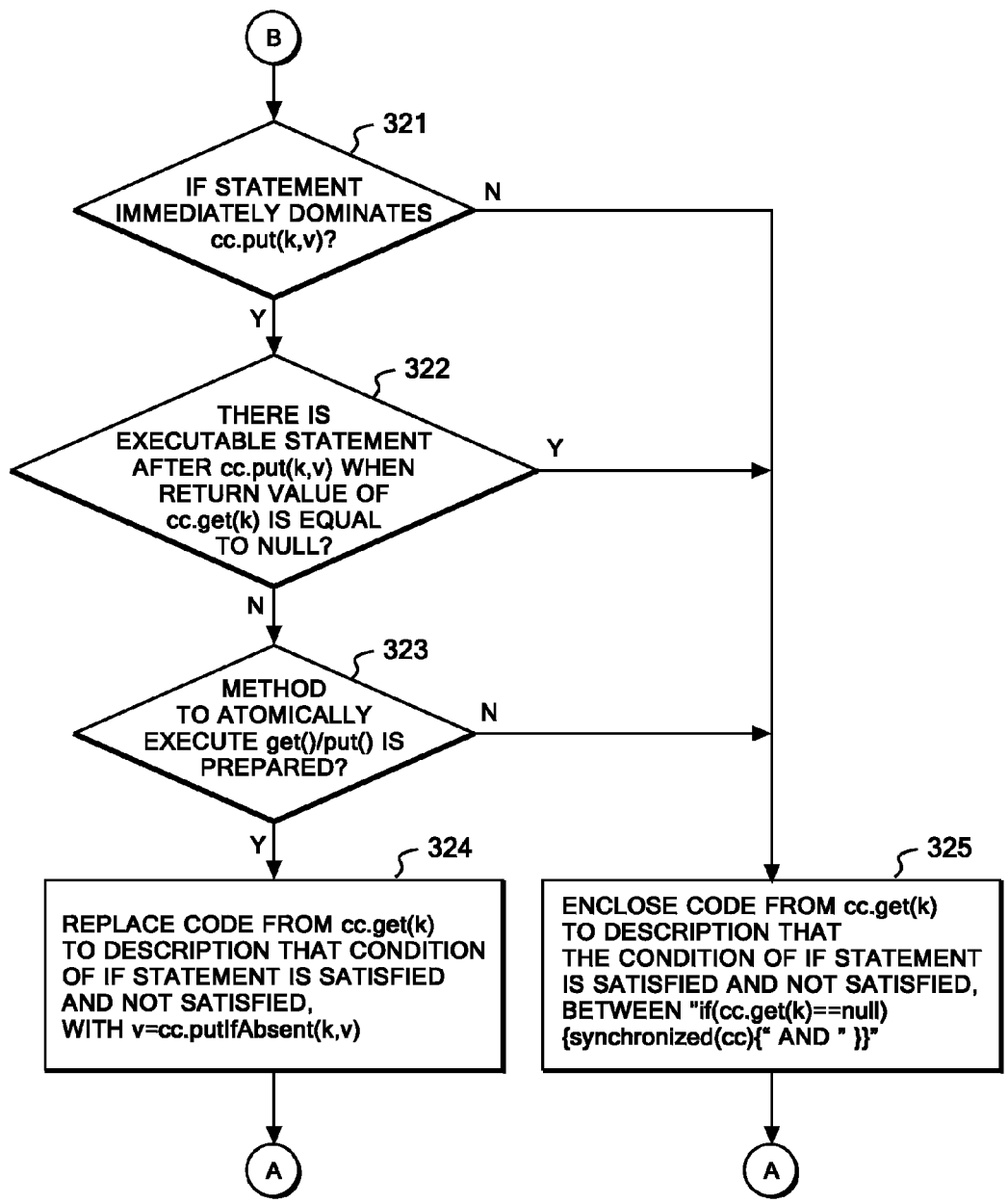

Hereinafter, steps 321 to 325 in FIG. 3C will be explained.

In step 321, the computer system (100) determines whether an 'if statement' immediately dominates cc.put(k,v). When the 'if statement' immediately dominates cc.put(k,v), the processing goes to step 322. Instead, when the 'if statement' does not immediately dominate cc.put(k,v), the processing goes to step 325.

In step 322, the computer system (100) determines whether there is an executable statement after cc.put(k,v) in a part of code executed when the return value of cc.get(k) is equal to null. When there is an executable statement after cc.put(k,v), the processing goes to step 325. Instead, when there is no executable statement after cc.put(k,v), the processing goes to step 323.

In step 323, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 324. Instead, when the method is not retrieved, the processing goes to step 325.

In step 324, the computer system (100) replaces, with v=cc.putIfAbsent(k,v), a part of code from cc.get(k) to code having description that the condition of the 'if statement' is satisfied and not satisfied. The method replaced here is the method retrieved by the search, that is, the method to atomically execute get( )/put( ). Upon completion of the replacement, the processing turns back to step 311, and the processing for another cc.put(k,v) is started. As for the aforementioned putIfAbsent( ) method, please see URL (http://java.sun.com/javase/6/docs/api/java/util/concurrent/ConcurrentHashMap.html#putIfAbsent(K,%20V)).

In step 325, the computer system (100) encloses a part of code from cc.get(k) to code having description that the condition of the 'if statement' is satisfied and not satisfied, between "if(cc.get(k)==null){synchronized(cc){" and "}}". Upon completion of the replacement, the processing turns back to step 311, and the processing for another cc.put(k,v) is started.

Figure 3D:
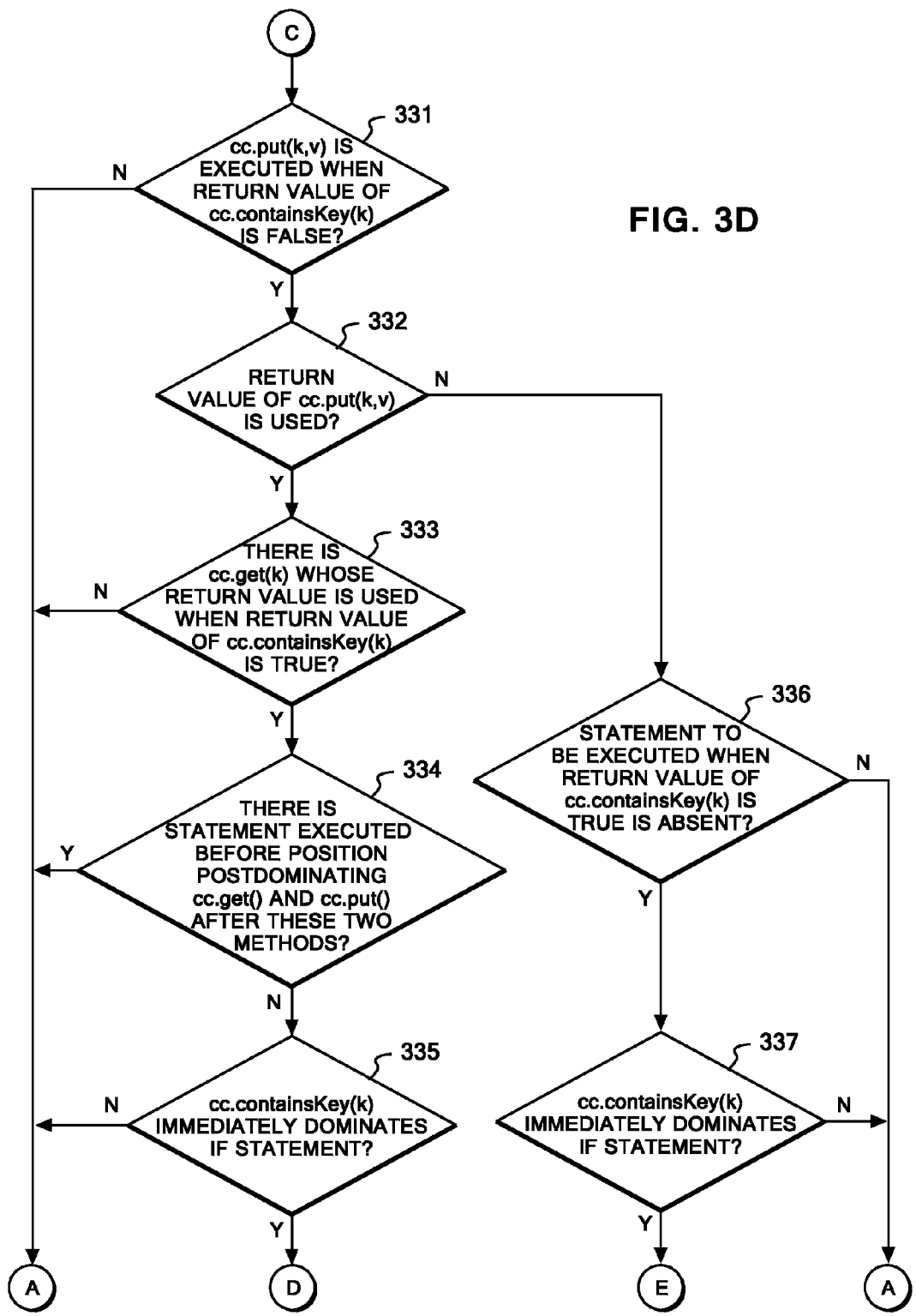

Hereinafter, steps 331 to 337 in FIG. 3D will be explained.

In step 331, the computer system (100) determines whether cc.put(k,v) is to be executed when the return value of cc.containsKey(k) is false. The situation in which cc.put(k,v) is to be executed when the return value of cc.containsKey(k) is false is that the 'if statement' is "if(cc.containsKey(k)==false){v=cc.put(k,v);}", for example. When cc.put(k,v) is to be executed, the processing goes to step 332. Instead, when cc.put(k,v) is not to be executed, the processing turns back to step 311, and the processing for another cc.put(k,v) is started.

In step 332, the computer system (100) determines whether the return value of cc.put(k,v) is used. When the return value of cc.put(k,v) is used in the CL, the processing goes to step 333. Instead, when the return value is not used, the processing goes to step 336.

In step 333, the computer system (100) determines whether there is cc.get(k) whose return value is used when the return value of cc.containsKey(k) is true. The situation in which there is cc.get(k) whose return value is used is that the CL includes code which uses the value v when the 'if statement' is "if(cc.containsKey(k)==true){v=cc.get(k);}", for example. When the CL includes cc.get(k) whose return value is used, the processing goes to step 334. Instead, when the CL does not include cc.get(k), the processing turns back to step 311, and the processing for another cc.put(k,v) is started.

In step 334, the computer system (100) determines whether there is a statement to be executed before a position of code postdominating cc.get( ) and cc.put( ) after these two methods. The position of code postdominating cc.get( ) and cc.put( ) after these two methods is the position of the code of a command to be executed in common to cc.get( ) and cc.put( ) for the first time, from among commands to be executed, without fail, after the execution of cc.get( ) and commands to be executed, without fail, after the execution of cc.put( ). When there is no statement to be executed, the processing goes to step 335. Instead, when there is a statement to be executed, the processing turns back to step 311, and the processing for another cc.put(k,v) is started.

In step 335, the computer system (100) determines whether cc.containsKey (k) immediately dominates an 'if statement'. The situation in which cc.containsKey(k) immediately dominates an 'if statement' is that cc.containsKey(k) is executed, without fail, before the execution of the 'if statement', and where there is absence of any command to be executed, without fail, after the execution of the cc.containsKey(k) and before the execution of the 'if statement'. When cc.containsKey(k) immediately dominates the 'if statement', the processing goes to step 341. Instead, when cc.containsKey(k) does not immediately dominate the 'if statement', the processing turns back to step 311, and the processing for another cc.put(k,v) is started.

In step 336, the computer system (100) determines whether there is absence of any statement to be executed when the return value of cc.containsKey(k) is true. The situation in which there is absence of any statement to be executed when the return value of cc.containsKey(k) is true is that the 'if statement' is "if(cc.containsKey(k)==true){//nop}", for example. When there is a statement to be executed is absent, the processing goes to step 337. Instead, when there a statement to be executed is not absent, the processing turns back to step 311, and the processing for another cc.put(k,v) is started.

In step 337, the computer system (100) determines whether cc.containsKey(k) immediately dominates an 'if statement'. When cc.containsKey(k) immediately dominates an 'if statement', the processing goes to step 346. Instead, when cc.containsKey(k) does not immediately dominate any 'if statement', the processing turns back to step 311, and the processing for another cc.put(k,v) is started.

Figure 3E:
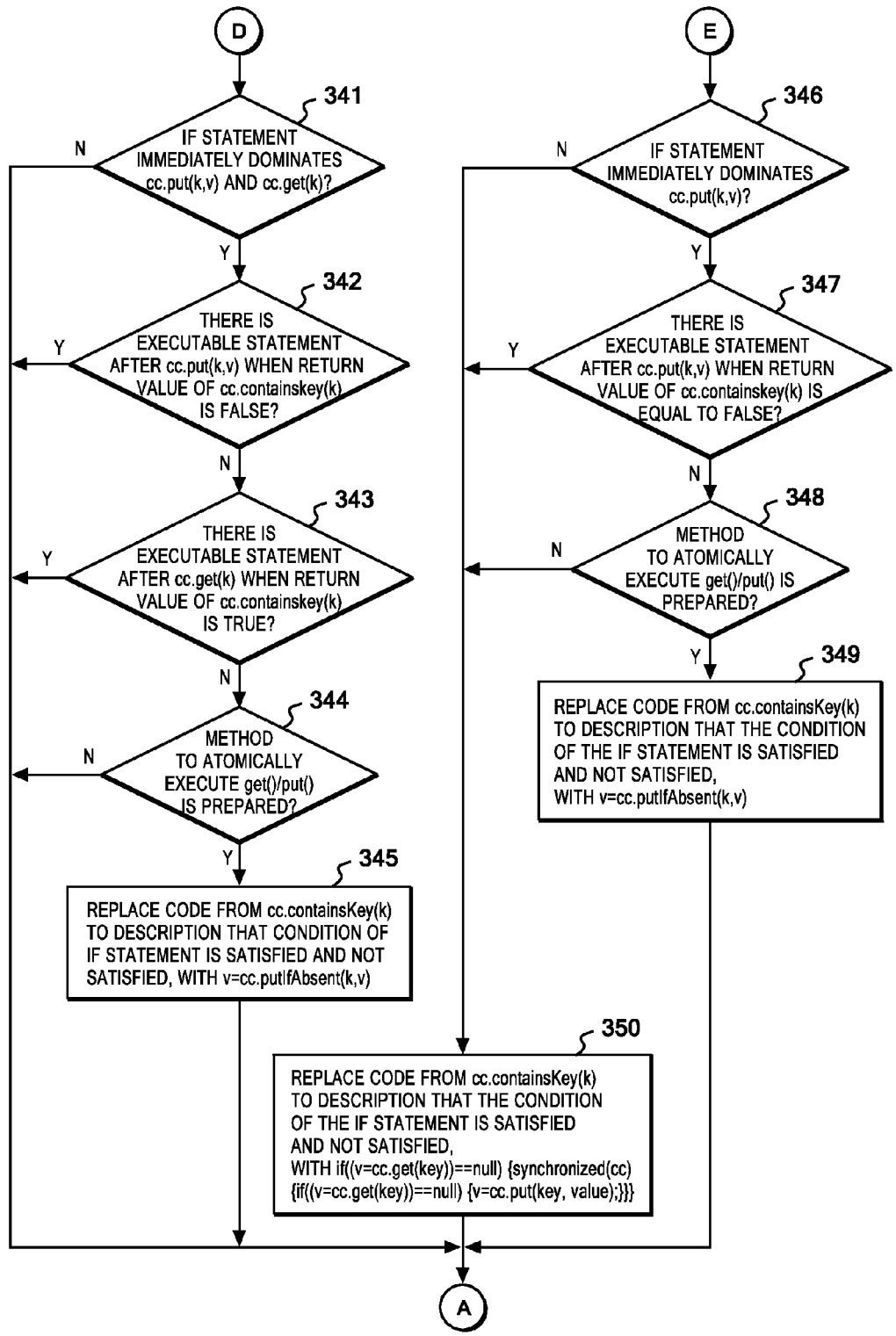

Hereinafter, steps 341 to 350 in FIG. 3E will be explained.

In step 341, the computer system (100) determines whether an 'if statement' immediately dominates cc.put(k,v) and cc.get(k). When the 'if statement' immediately dominates cc.put(k,v) and cc.get(k), the processing goes to step 342. Instead, when the 'if statement' does not immediately dominate cc.put(k,v) and cc.get(k), the processing turns back to step 311, and the processing for another cc.put(k,v) is started.

In step 342, the computer system (100) determines whether there is an executable statement after cc.put(k,v) in the part of code executed when the return value of cc.containskey(k) is false. When there is an executable statement after cc.put(k,v), the processing turns back to step 311, and the processing for another cc.put(k,v) is started. Instead, when there is no executable statement after cc.put(k,v), the processing goes to step 343.

In step 343, the computer system (100) determines whether there is an executable statement after cc.get(k) in the part of code executed when the return value of cc.containskey(k) is true. When there is an executable statement after cc.get(k,v), the processing turns back to step 311, and the processing for another cc.put(k,v) is started. Instead, when there is no executable statement after cc.get(k,v), the processing goes to step 344.

In step 344, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 345. Instead, when the method is not retrieved, the processing turns back to step 311, and the processing for another cc.put(k,v) is started.

In step 345, the computer system (100) replaces, with v=cc.putIfAbsent(k,v), a part of code from cc.containsKey(k) to code having description that the condition of the 'if statement' is satisfied and not satisfied. The method replaced here is the method retrieved by the search, that is, the method to atomically execute get( )/put( ). Upon completion of the replacement, the processing turns back to step 311, and the processing for another cc.put(k,v) is started.

In step 346, the computer system (100) determines whether an 'if statement' immediately dominates cc.put(k,v). When the 'if statement' immediately dominates cc.put(k,v), the processing goes to step 347. Instead, when the 'if statement' does not immediately dominate cc.put(k,v), the processing goes to step 350.

In step 347, the computer system (100) determines whether there is an executable statement after cc.put(k,v) in the part of code executed when the return value of cc.containskey(k) is equal to false. When there is an executable statement after cc.put(k,v), the processing goes to step 350. Instead, when there is no executable statement after cc.put(k,v), the processing goes to step 348.

In step 348, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 349. Instead, when the method is not retrieved, the processing goes to step 350.

In step 349, the computer system (100) replaces, with v=cc.putIfAbsent(k,v), a part of code from cc.containsKey(k) to code having description that the condition of the 'if statement' is satisfied and not satisfied. The method replaced here is the method retrieved by the search, that is, the method to atomically execute get( )/put( ). Upon completion of the replacement, the processing turns back to step 311, and the processing for another cc.put(k,v) is started.

In step 350, the computer system (100) replaces a part of code from cc.containsKey(k) to code having description that the condition of the 'if statement' is satisfied and not satisfied, with if((v=cc.get(key))==null) {synchronized(cc) {if ((v=cc.get(key))==null) {v=cc.put(key, value);}}}. Upon completion of the replacement, the processing turns back to step 311, and the processing for another cc.put(k,v) is started.

Each of FIGS. 3F to 3J shows a detailed flow of the processing in step 305 in FIG. 3A according to the embodiment of the present invention.

In the following explanation of FIGS. 3F to 3J, SB1, SB2 and SB3 denote different synchronized blocks, respectively.

In step 305, the computer system (100) corrects a synchronized block (called SB1 below). The computer system (100) performs each step of the following processing (FIGS. 3F to 3J).

Figure 3F:
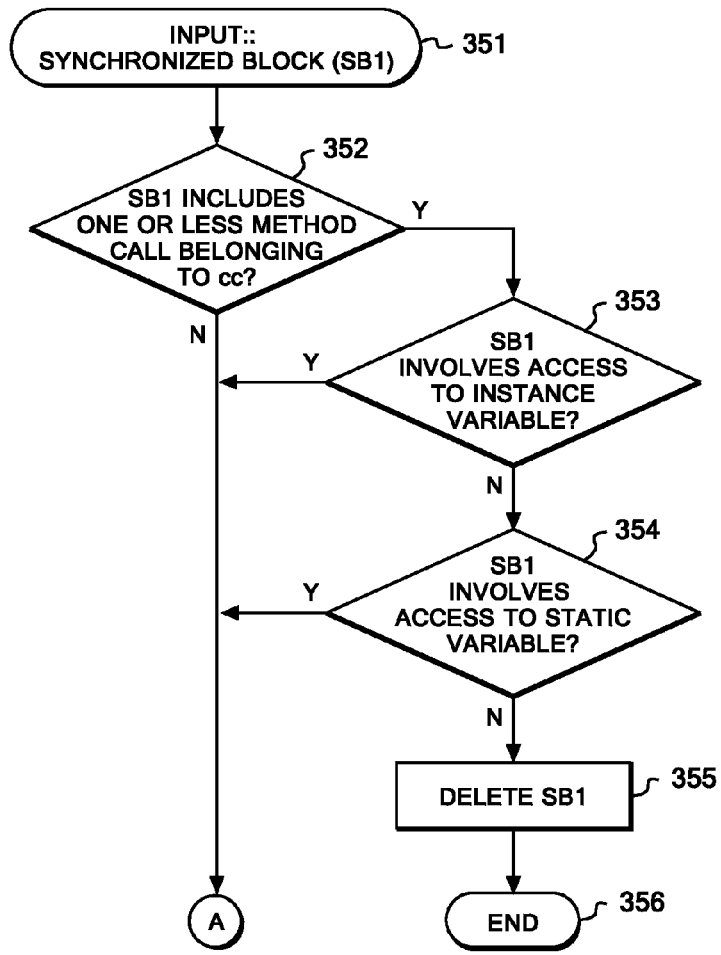
FIG. 3F shows a flow of the processing in step 305 in FIG. 3A in the embodiment of the present invention, that is, the processing of deleting the SB1 under given requirements.

FIG. 3F shows a flow of the processing in step 305 in FIG. 3A in the embodiment of the present invention. Specifically, FIG. 3F shows the processing of deleting the SB1 under given requirements.

Step 351 is the start of the step 305 in FIG. 3A.

In step 352, the computer system (100) determines whether the SB1 includes one or less method call belonging to the instance cc of the concurrent Hashtable class. Here, "one or less method is included" means that "one method call or no method call is included." At this time, the computer system (100) does not count, as one code unit of a method call, the code of each of method calls belonging to the instance cc and being included in the rewriting result of the aforementioned step 304, but counts, as one code unit, the whole code of all the method calls belonging to the instance cc and being included in the rewriting result.

When the number of code units of method calls thus counted is one or less, the processing goes to step 353. Instead, when the number of code units of method calls thus counted is two or more, the processing goes to step 361.

In step 353, the computer system (100) determines whether the SB1 involves an access to an instance variable. The computer system (100) checks whether a section enclosed in SB1 includes code to access the instance variable. When the code to access the instance variable is included, the processing goes to step 361. Instead, when the code to access the instance variable is not included, the processing goes to step 354.

In step 354, the computer system (100) determines whether the SB1 involves an access to a static variable. The computer system (100) checks whether the section enclosed in the SB1 includes code to access a static variable. When the code to access a static variable is included, the processing goes to step 361. Instead, when the code to access a static variable is not included, the processing goes to step 355.

In step 355, the computer system (100) deletes the SB1. The deletion mentioned here is deleting the description of the SB1 from the code, or changing the description thereof into an annotation. The changing of the description thereof into an annotation means to put the described processing into a non-executable state. Upon completion of the lock deletion, the processing goes to step 356, and step 305 is terminated.

The processing in steps 351 to 355 reduces the frequency of lock contentions.

Figure 3G:
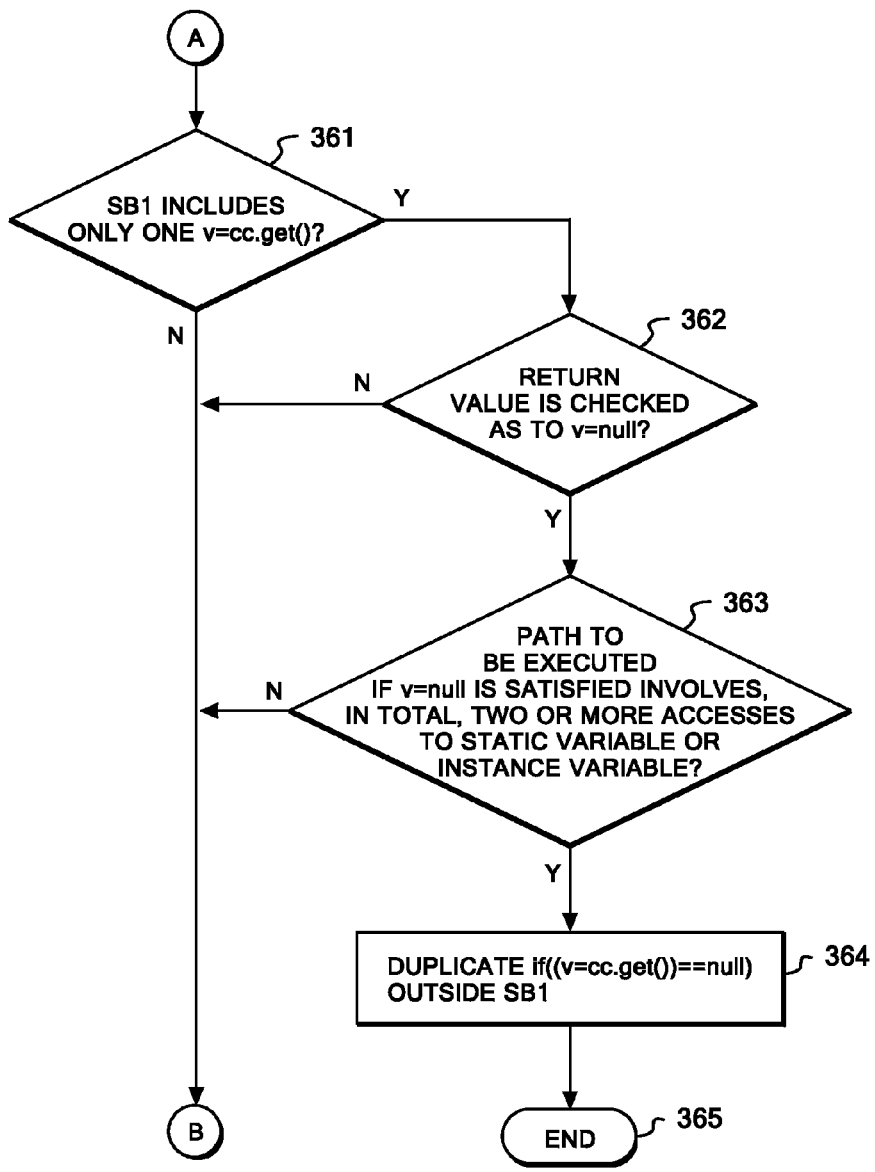
FIG. 3G shows a flow of the processing in step 305 in FIG. 3A according to the embodiment of the present invention, that is, the processing of deleting the SB1 under given requirements and further performing code conversion accompanied by the deletion.

FIG. 3G shows a flow of the processing in step 305 in FIG. 3A according to the embodiment of the present invention, that is, the processing of deleting the SB1 under given requirements and further performing code conversion accompanied by the deletion.

In step 361, the computer system (100) determines whether the SB1 includes only one v=cc.get( ). The computer system (100) counts the number of code units of get method calls (v=cc.get( )) from the instance cc enclosed in the SB1. Here, v denotes the return value of the get method. The get method may include a certain argument. When there is one get method, the processing goes to step 362. Instead, when there are zero, two or more get methods, the processing goes to step 371.

In step 362, the computer system (100) determines whether the return value v is checked as to v=null. The computer system (100) checks whether the section enclosed in the SB1 includes code of null check for the return value v. The null check is indicated by if(v==null), for example. When the code of the null check is included, the processing goes to step 363. Instead, when the code of the null check is not included, the processing goes to step 371.

In step 363, the computer system (100) determines whether the path to be executed if v=null is satisfied involves, in total, two or more accesses to a static variable or instance variable. The computer system (100) checks the code inside the path to be executed if the return value is determined as null in the null check. Assuming that the null check is if(v==null), for example, the path is a section enclosed in the if block. When the path includes two or more units of code to access the instance variable or static variable in total, the processing goes to step 364. Instead, when the path includes zero or one unit of code to access, the processing goes to step 371.

In step 364, the computer system (100) duplicates if((v=cc.get( ))==null) outside the SB1. Upon completion of the duplication processing, the processing goes to step 365 which is the end of step 305.

The processing in steps 361 to 365 reduces a time of lock contention.

Figure 3H:
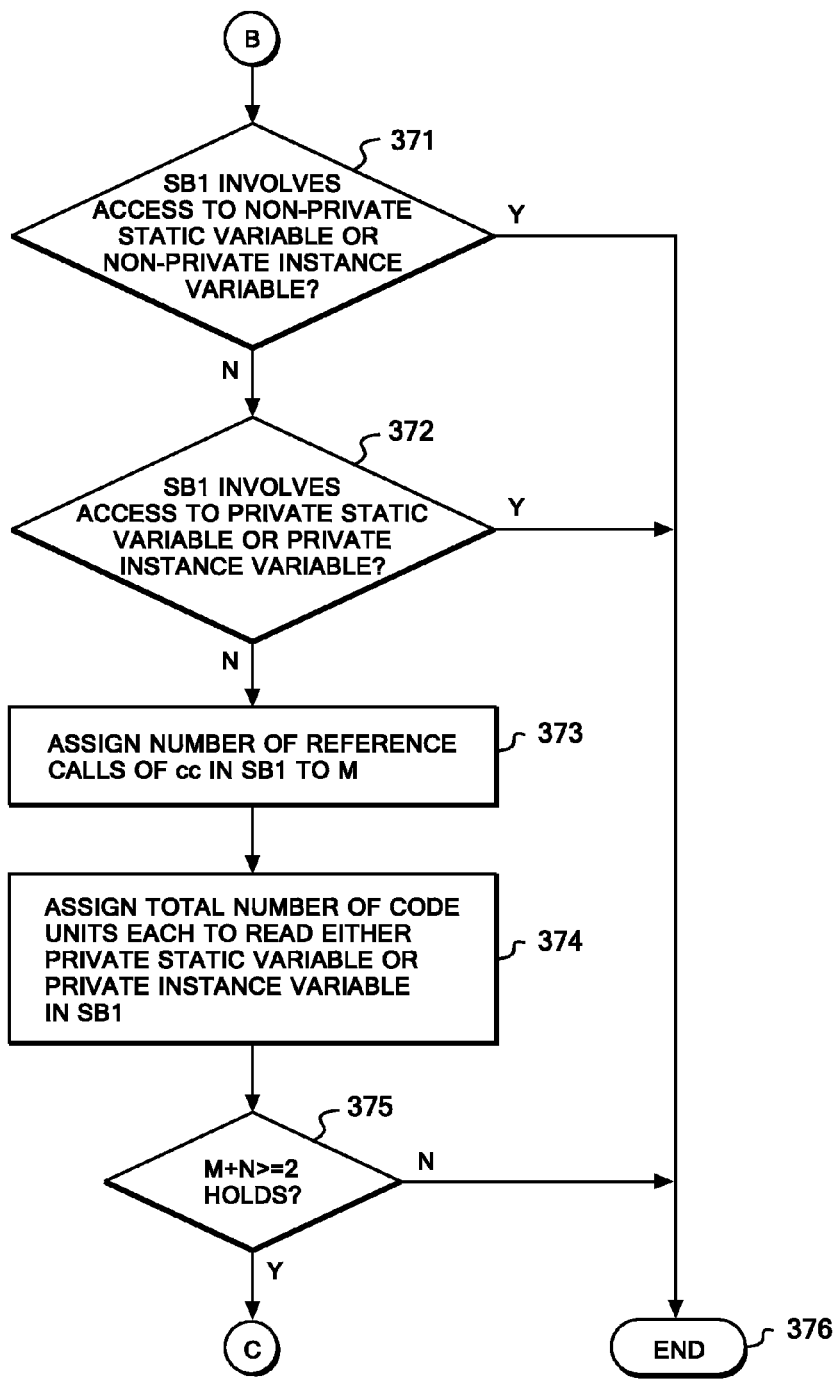
FIG. 3H shows a flow of the processing in step 305 in FIG. 3A according to the embodiment of the present invention, that is, under given requirements, the processing of replacing the lock of the block SB1 with a read lock, and also replacing another synchronized block included in the block SB1 with a write lock.
Figure 3I:
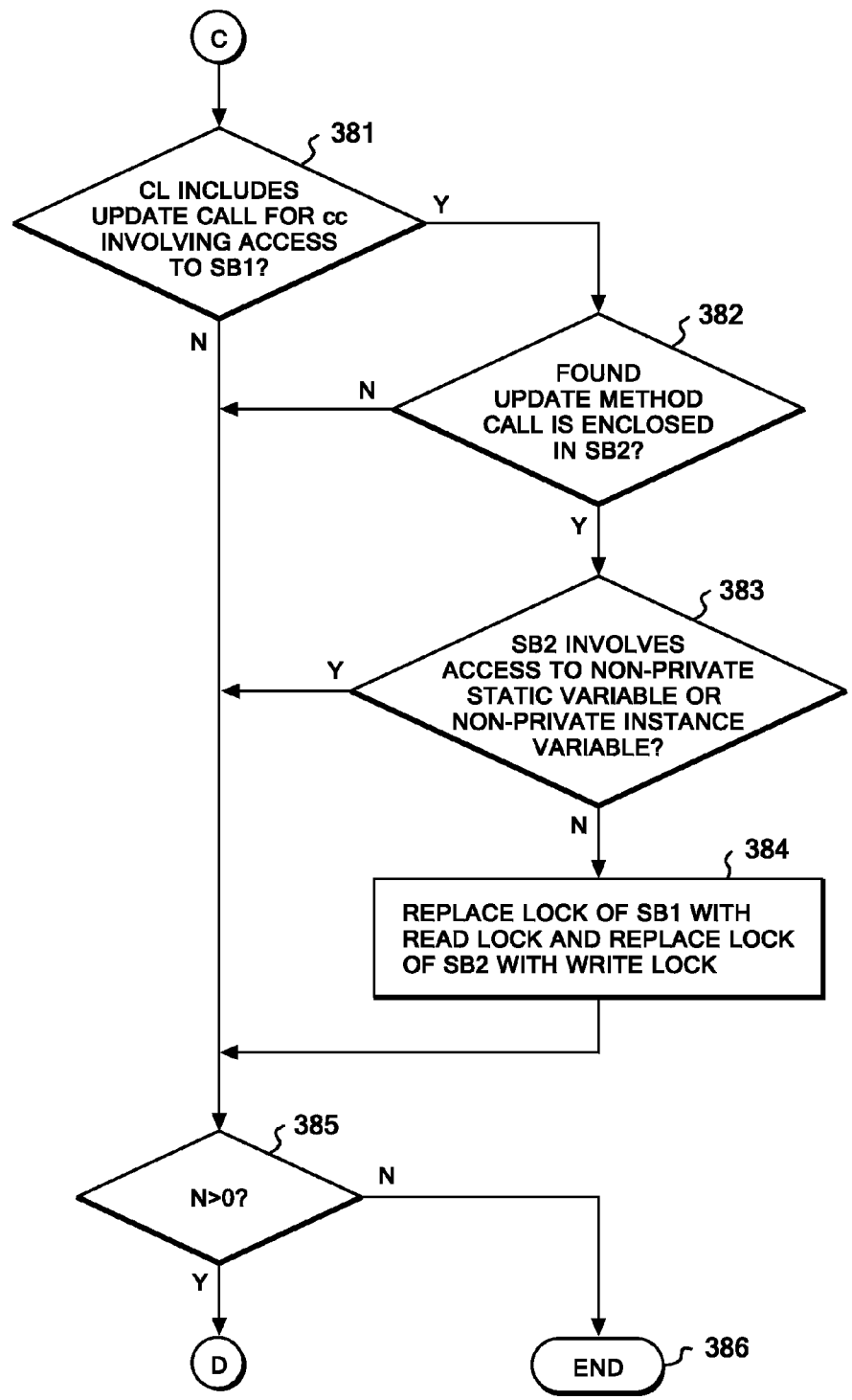
FIG. 3I shows a flow of the processing in step 305 in FIG. 3A according to the embodiment of the present invention, that is, under given requirements, the processing of replacing the lock of the block SB1 with the read lock, and also replacing the other synchronized block included in the block SB1 with the write lock.
Figure 3J:
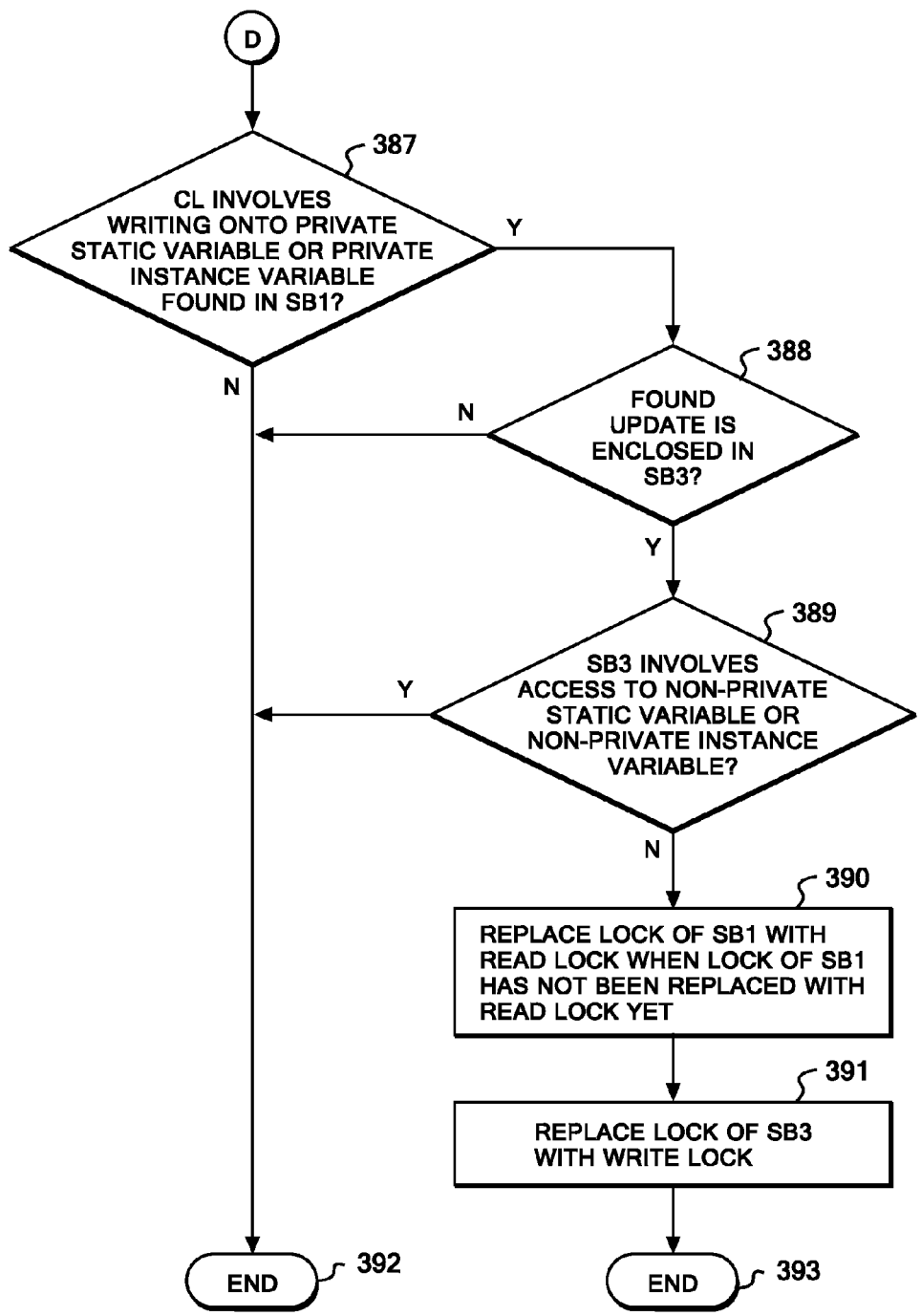
FIG. 3J shows a flow of the processing in step 305 in FIG. 3A according to the embodiment of the present invention, that is, under given requirements, the processing of replacing the lock of the block SB1 with the read lock, and also replacing the other synchronized block included in the block SB1 with the write lock.

Each of FIGS. 3H, 3I and 3J shows a flow of the processing in step 305 in FIG. 3A according to the embodiment of the present invention, that is, the processing of replacing the lock of the block SB1 with a read lock, and also replacing another synchronized block included with a write lock.

Here, the "read lock" is a lock which allows multiple threads to perform read operations at one time unless a write operation is performed, and the "write lock" is a lock which a thread uses to perform such exclusive control as to prohibit accesses from other threads when performing a write operation. Such replacement of the synchronized block with the read lock or the write lock eliminates exclusive locks which are unnecessary for the read operation, and thereby reduces the frequency of lock contentions.

Hereinafter, steps 371 to 376 in FIG. 3H will be explained.

In step 371, the computer system (100) determines whether the SB1 involves an access to a non-private static variable or non-private instance variable. The computer system (100) checks whether the section enclosed in the SB1 includes code to access the non-private static variable or non-private instance variable. When the code to access is included, the processing goes to step 376, and then is terminated. Instead, when the code to access is not included, the processing goes to step 372.

In step 372, the computer system (100) determines whether the SB1 includes code to write onto a private static variable or private instance variable. The computer system (100) checks whether the section enclosed in the SB1 includes code to write onto a private static variable or private instance variable. When the code to write is included, the processing goes to step 376, and then is terminated. Instead, when the code to write is not included, the processing goes to step 373.

In step 373, the computer system (100) counts the number of code units (M) of reference method calls being included in the section enclosed in the SB1 and belonging to an instance cc. The reference method belonging to the instance cc is a method to retrieve a value shared among threads.

In step 374, the computer system (100) counts a total value (N) of the number of units of code to read a private static variable and the number of units of code to read a private instance variable in the section enclosed in the SB1.

In step 375, the computer system (100) determines whether M+N>=2 holds. The computer system (100) calculates M+N. When M+N is equal to or larger than 2, the processing goes to step 381. When M+N is equal to or smaller than 1, then the processing goes to step 376 and then is terminated.

Hereinafter, steps 381 to 386 in FIG. 3I will be explained.

In step 381, the computer system (100) determines whether the CL includes an update call in the SB1 involving an access to the instance cc. The computer system (100) checks the whole code of the class including the SB1. When the code of the update method call belonging to the instance cc included in the section enclosed in the SB1 is found in the CL as a result of the check, the processing goes to step 382. Instead, when the code is not found, the processing goes to step 385. Here, the update method call belonging to the instance cc is cc.put( ), for example.

In step 382, the computer system (100) determines whether the found update method call is enclosed in a second synchronized block (abbreviated as SB2 below). The computer system (100) checks whether the code of the found call is included in a section enclosed in the SB2. When the call is included, the processing goes to step 383. Instead, when the call is not included, the processing goes to step 385.

In step 383, the computer system (100) determines whether the SB2 involves an access to a non-private static variable or non-private instance variable. The computer system (100) checks whether the section enclosed in the SB2 includes code to access a non-private static variable or non-private instance variable. When the code to access is included, the processing goes to step 385. Instead, when the code to access is not included, the processing goes to step 384.

In step 384, the computer system (100) replaces the lock of the SB1 with the read lock. In addition, the computer system (100) replaces the lock of the SB2 with the write lock. Upon completion of the replacement, the processing goes to step 385.

In step 385, the computer system (100) makes a determination as to the total value (N) obtained in step 374. The processing goes to step 387 when N>0 holds, whereas the processing goes to step 386 and then is terminated when N>0 does not hold.

Hereinafter, steps 387 to 393 in FIG. 3J will be explained.

In step 387, the computer system (100) determines whether the CL involves writing onto the private static variable or private instance variable which is found in the SB1. The computer system (100) checks the whole code of the class including the SB1. When the checking finds that the CL involves writing onto the private static variable or the private instance variable which is read in the section enclosed in the SB1, the processing goes to step 388. Instead, when the writing is not found, the processing goes to step 392, and then is terminated.

In step 388, the computer system (100) determines whether the found update is enclosed in a third synchronized block (abbreviated as SB3 below). If the code of the found update is included in the SB3, the processing goes to step 389. If not, the processing goes to step 392, and then is terminated.

In step 389, the computer system (100) determines whether the SB3 involves an access to a non-private static variable or non-private instance variable. The computer system (100) checks whether the section enclosed in the SB3 includes code to access a non-private static variable or the non-private instance variable. When the code to access is included, the processing goes to step 392, and then is terminated. Instead, when the code to access is not included, the processing goes to step 390.

In step 390, the computer system (100) replaces the lock of the SB1 with the read lock when the lock of the SB1 has not been replaced with the read lock yet.

In step 391, the computer system (100) replaces the lock of SB3 with the write lock.

Both of steps 392 and 393 are the end of step 305.

Figure 4A:
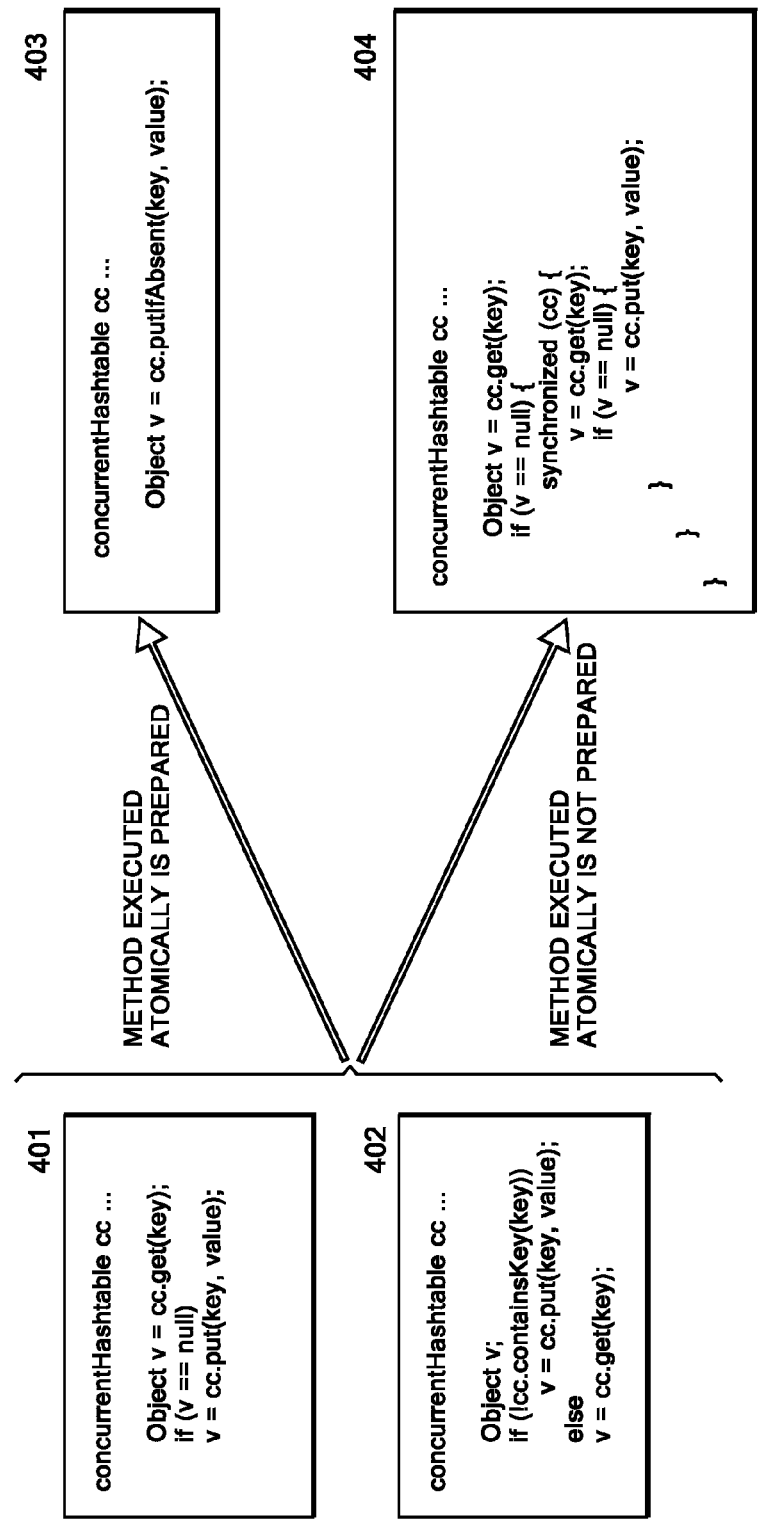
FIG. 4A shows an example of code conversion in step 304 in FIG. 3A according to the embodiment of the present invention.

FIG. 4A shows an example of code conversion in step 304 in FIG. 3A according to the embodiment of the present invention.

FIG. 4A shows a correspondence between the first code and the second code. Code (401) and code (402) are examples of the first code, whereas code (403) and code (404) are examples of the second code.

The computer system (100) performs the processing in step 304 in FIG. 3A (more specifically, steps in FIGS. 3B to 3E) on each of the code (401) and code (402). Through the processing, the code (401) and code (402) are rewritten to either of the code (403) and code (404). Here, when the instance cc is an instance of the concurrent Hashtable class having a putIfAbsent( ) method to atomically execute a pair of methods (get( )/put( )), the code (401) and code (402) are converted into the code (403). When the instance cc is an instance of the concurrent Hashtable class having no putIfAbsent( ) method, the code (401) and code (402) are converted into the code (404).

FIG. 4B shows a CL (class X) that is the first Java code (108) in the memory (102) shown in FIG. 1 according to the embodiment of the present invention.

FIG. 4C shows a CL (class X) that is the second Java code (110) in the memory (102) shown in FIG. 1 according to the embodiment of the present invention.

The following shows an example in which the CL (class X) of the first Java code before conversion shown in FIG. 4B is converted into the CL (class X) of the second Java code after conversion shown in FIG. 4C through the application of the conversion processing shown in FIG. 3A.

In FIG. 4B, the class X includes an inherited reserved word extends. The first line of the class X, "public class X extends Hashtable" is a declaration that the class X inherits the Hashtable class. Accordingly, the class X satisfies the condition (the inheritance of a Hashtable class) in step 201 in FIG. 2, and therefore is subjected to the conversion processing in steps in FIG. 3A.

The computer system (100) inserts into the class X code to generate an instance of the concurrent Hashtable class corresponding to the Hashtable class in accordance with step 301 (the insertion of code to generate an instance) in FIG. 3A. The inserted code is "private concurrentHashtable cc=new concurrentHashtable( );" (see //X'00 in FIG. 4C).

The computer system (100) corrects super class calls in accordance with step 302 (the correction of super class calls) in FIG. 3A. With this correction, the super class call in the constructor (see //X02 in FIG. 4B) is deleted or changed into an annotation (see //X'02 in FIG. 4C). In addition, the super class calls (see //X05, //X19, //X22 in FIG. 4B) are corrected to calls to the instance cc of the concurrent Hashtable class (see //X'05, //X'19, //X'22 in FIG. 4C).

The computer system (100) adds a method in accordance with step 303 (addition of a method belonging to the synchronized Hashtable class). Here, this class X does not need any method to be added in step 303.

The computer system (100) rewrites the code in accordance with step 304 (the rewriting of code). Here, this class X does not have any code rewritten in step 304.

The computer system (100) rewrites the code in accordance with step 305 (correction of synchronized block). On the lines //X04 to //X10, only cc.get( ) on //X05 involves an access to the instance cc. Moreover, in the path if (ret==null) { ... } on //X06, parent is referred to two or more times. Thus, the synchronized modifier (synchronized) on //X04 is deleted. In addition, the path if (ret==null) { ... } on //X06 is enclosed in a synchronized block, and "ret=cc.get( );if (ret==null)" is duplicated outside the synchronized block. In this way, the code shown in FIG. 4C is obtained as the second Java code after the conversion.

Figure 5A:
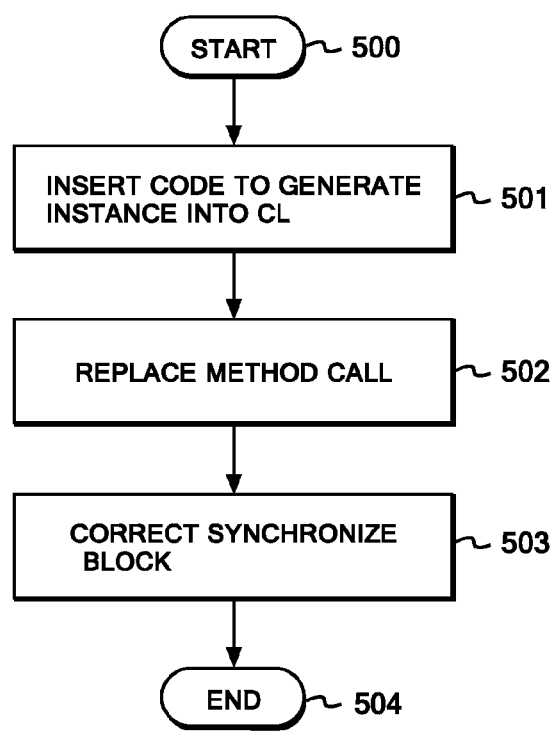
FIG. 5A shows a detailed flow of the processing in step 205 in FIG. 2 according to the embodiment of the present invention.

FIG. 5A shows a detailed flow of the processing in step 205 in FIG. 2 according to the embodiment of the present invention.

Step 205 in FIG. 2 is the conversion processing in the case where a method provided by a synchronized map class uses a thread-specific value as a key of a map.

Step 500 is the start of step 205 in FIG. 2.

In step 501, when code to generate an instance of the synchronized map class is used, the computer system (100) replaces the used code with code to generate an instance of a thread local class (java.lang.ThreadLocal). The newly inserted code is "ThreadLocal tlh=new ThreadLocal( );", for example.

Here, the "thread local class" is a class providing a thread local variable, that is, a variable capable of taking independently different values when used in different threads, even though being a single variable.

In this description, tlh denotes a private variable to which the generated instance of the thread local class is assigned, sc denotes an instance variable of the synchronized map class, and thr denotes the thread-specific value.

In step 502, the method call from the instance of the synchronized map class is replaced with a method call from a thread local instance. More specifically, when thr is assumed to be a thread-specific value, method calls sc.get(thr), sc.put (thr, value), sc.remove(thr) from the instance sc of the synchronized map class are replaced with method calls tlh.get( ), tlh.put(value), tlh.remove( ) from the instance tlh of the thread local class, respectively. Moreover, the computer system (100) may execute dead code elimination. Through the dead code elimination, unnecessary assignment statement is deleted.

In step 503, the following processing is performed if each method replaced in step 501 or 502 is enclosed in a synchronized block. (a) The synchronized block is deleted when any other instance variable or static variable is not included in the synchronized block. (b) When the following two conditions (X) and (Y) are satisfied: (X) the synchronized block includes only one method call tlh.get( ) from the instance tlh; and (Y) the path to be executed when the return value of the method call tlh.get( ) is null involves reading and writing the instance variable and the static variable two or more times, the synchronized block existing from the beginning is deleted. In addition, the path to be executed when the return value of tlh.get( ) is null is enclosed in a new synchronized block. Then, "v=tlh.get( ); if (v==null)" is duplicated inside the new synchronized block. (c) When the total sum of the number of reference method calls belonging to the method calls tlh from the instance tlh (a rewriting result in step 502 is counted as one), and the number of the reading times of the private instance variable and the static variable is two or more in the synchronized block, the synchronized block is replaced with the read lock.

Additionally, the write lock is inserted inside the synchronized block involving the update of the pair of variables (the writing of the private instance variable and static variable) in the whole class.

Note that, steps 502 and 503 in FIG. 5A may be executed in any order.

Each of FIGS. 5B to 5F shows a detailed flow of the processing in step 503 in FIG. 5A according to the embodiment of the present invention.

In step 503, the computer system (100) corrects the synchronized block (SB1). The computer system (100) performs each step of the following processing (FIGS. 5B to 5F) on the SB1.

In the following description of FIGS. 5B to 5F, SB1, SB2 and SB3 denote different synchronized blocks, respectively.

Figure 5B:
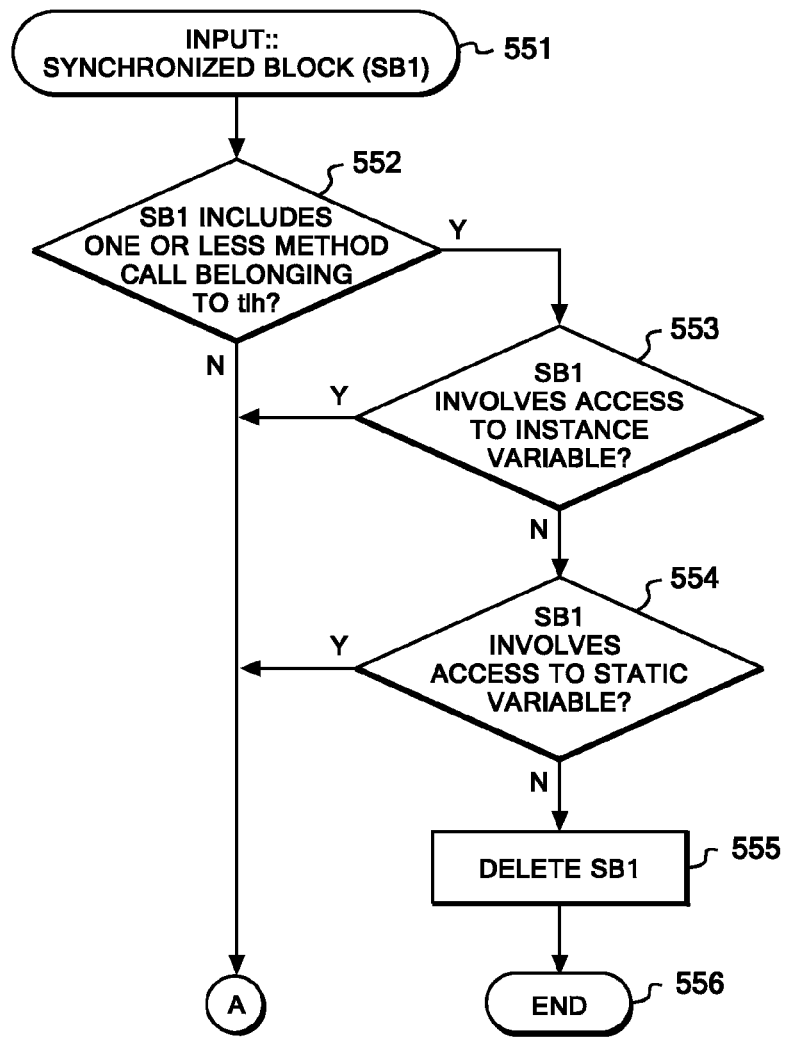
FIG. 5B shows a flow of the processing in step 503 in FIG. 5A according to the embodiment of the present invention, that is, the processing of deleting the SB1 under given requirements.

FIG. 5B shows a flow of the processing in step 503 in FIG. 5A according to the embodiment of the present invention. Specifically, FIG. 5B shows the processing of deleting the SB1 under given requirements.

Step 551 is the start of step 503 in FIG. 5A.

In step 552, the computer system (100) determines whether the SB1 includes one or less method call belonging to an instance tlh. Here, "one or less method call is included" means that one method call or no method call is included. At this time, the computer system (100) does not count, as one code unit of a method call, the code of each of method calls that belong to the instance tlh and are included in the rewriting result of the aforementioned step 502, but counts, as one code unit, the whole code of all the method calls belonging to the instance tlh and included in the rewriting result.

When the number of code units of method calls thus counted is one or less, the processing goes to step 553. Instead, when the number of code units of method calls thus counted is two or more, the processing goes to step 561.

In step 553, the computer system (100) determines whether the SB1 involves an access to an instance variable. The computer system (100) checks whether the section enclosed in the SB1 includes code to access an instance variable. When the code to access an instance variable is included, the processing goes to step 561. Instead, when the code to access an instance variable is not included, the processing goes to step 554.

In step 554, the computer system (100) determines whether the SB1 involves an access to a static variable. The computer system (100) checks whether the section enclosed in the SB1 includes code to access a static variable. When the code to access a static variable is included, the processing goes to step 561. Instead, when the code to access a static variable is not included, the processing goes to step 555.

In step 555, the computer system (100) deletes the SB1. The deletion mentioned here is deleting the description of the SB1 from the code, or changing the description thereof into an annotation. The changing of the description thereof into an annotation means to put the described processing into a non-executable state. Upon completion of the lock deletion, the processing goes to step 556, and step 305 is terminated.

The processing in steps 551 to 555 reduces the frequency of lock contentions.

Figure 5C:
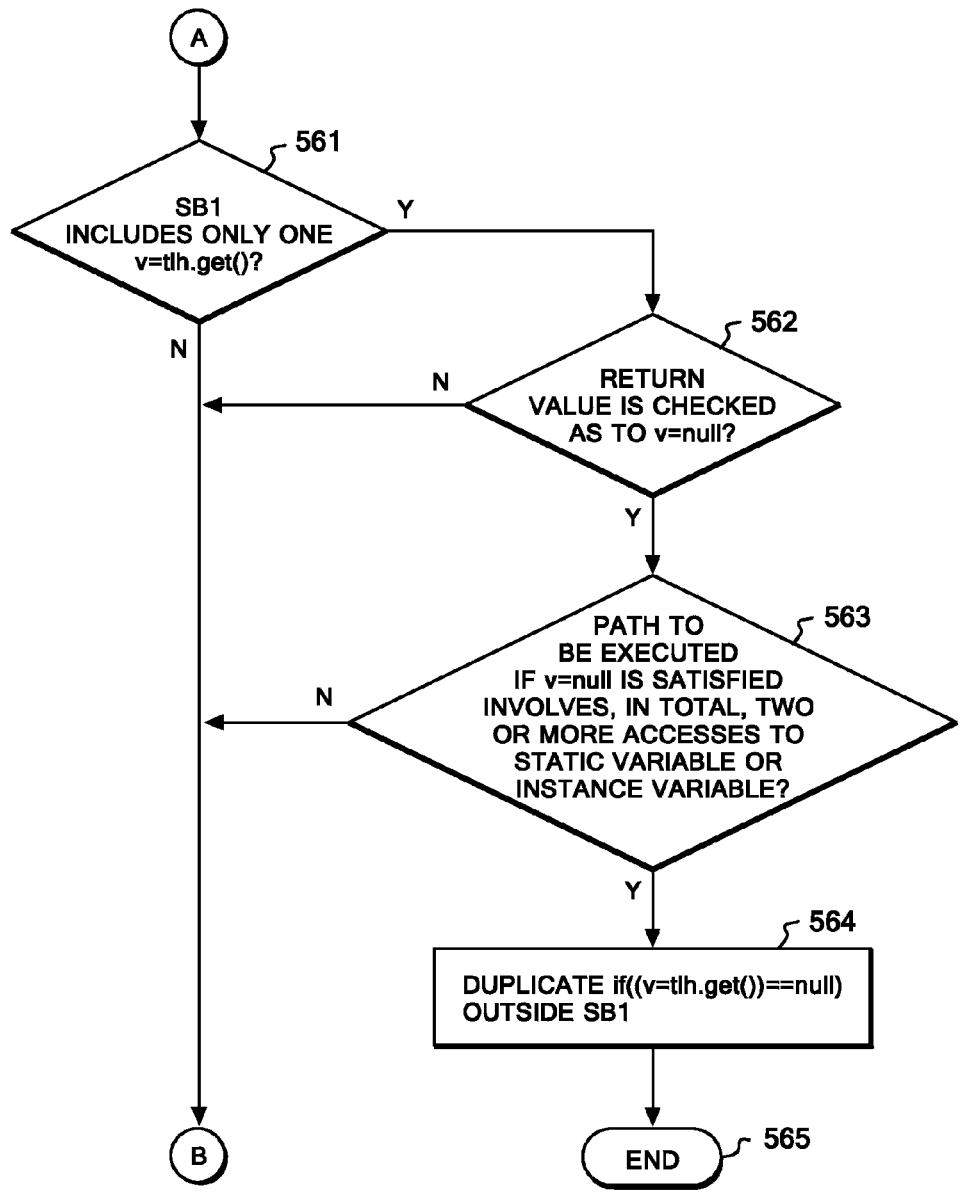
FIG. 5C shows a flow of the processing in step 503 in FIG. 5A in the embodiment of the present invention, that is, the processing of deleting the SB1 under the given requirement and further performing code conversion accompanied by the deletion.

FIG. 5C shows a flow of the processing in step 503 in FIG. 5A in the embodiment of the present invention, that is, the processing of deleting the SB1 under the given requirement and further performing code conversion accompanied by the deletion.

In step 561, the computer system (100) determines whether the SB1 includes only one v=tlh.get( ). The computer system (100) counts the number of code units of get method calls (v=tlh.get( )) from the instance tlh enclosed in the SB1. Here, v denotes the return value of the get method. When there is one get method, the processing goes to step 562. Instead, when there are zero, two or more get methods, the processing goes to step 571.

In step 562, the computer system (100) determines whether the return value v is checked as to v=null. The computer system (100) checks whether the section enclosed in the SB1 includes code of null check for the return value v. The null check is indicated by if(v==null), for example. When the code of the null check is included, the processing goes to step 563. Instead, when the code of the null check is not included, the processing goes to step 571.

In step 563, the computer system (100) determines whether the path to be executed if v=null is satisfied involves, in total, two or more accesses to a static variable or instance variable. The computer system (100) checks the code inside the path to be executed if the return value is determined as null in the null check. Assuming that the null check is if(v==null), for example, the path is a section enclosed in the if block. When the path includes two or more units of code to access an instance variable or static variable in total, the processing goes to step 564. Instead, when the path includes zero or one unit of code to access, the processing goes to step 571.

In step 564, the computer system (100) duplicates if((v=tlh.get( ))==null) outside the SB1. Upon completion of the duplication processing, the processing goes to step 565 which is the end of step 503.

The processing in steps 561 to 565 reduces a time of lock contention.

Figure 5D:
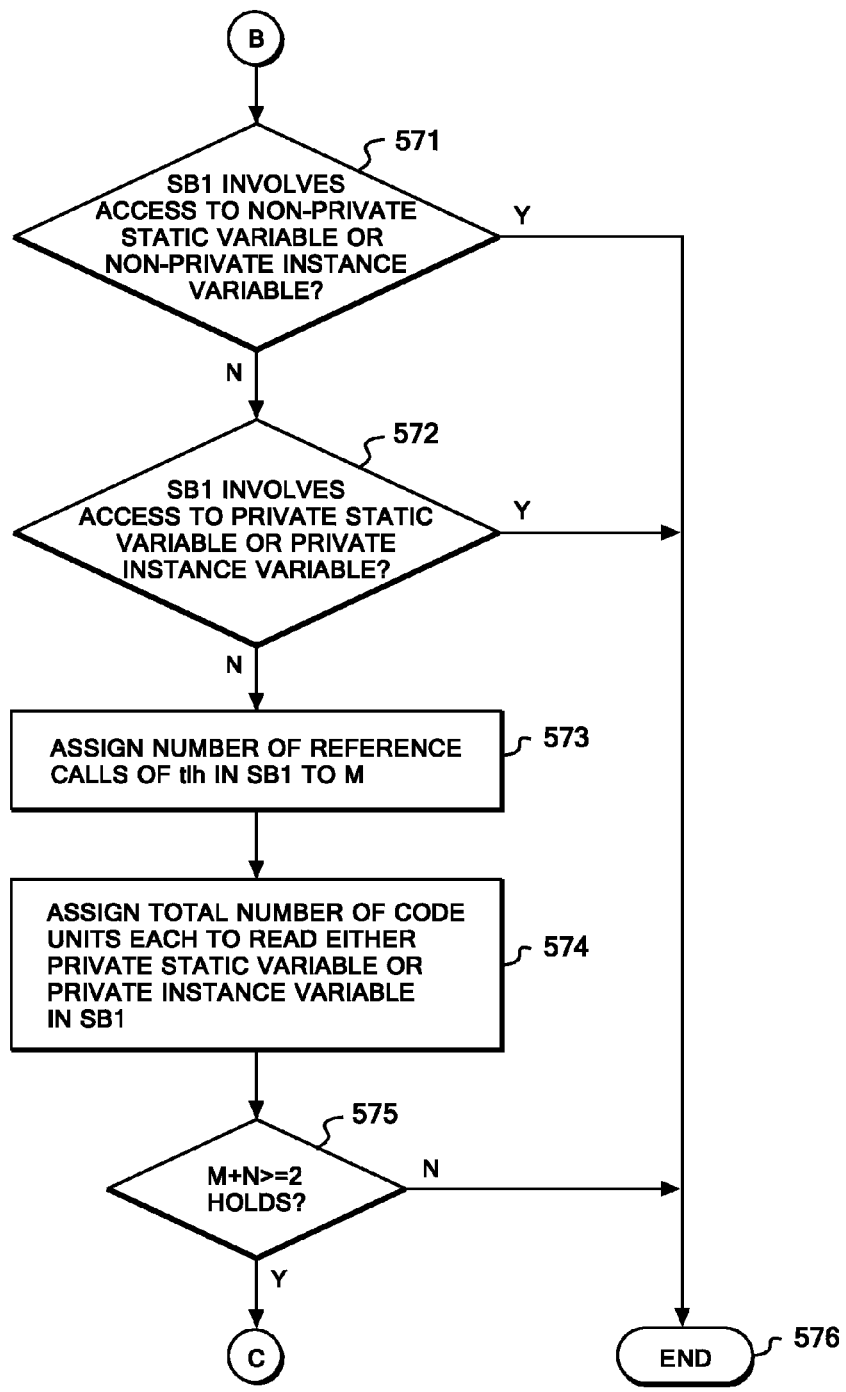
FIG. 5D shows a flow of the processing in step 503 in FIG. 5A according to the embodiment of the present invention, that is, the processing of replacing the lock of the block SB1 with a read lock, and also replacing another synchronized block included in the block SB1 with a write lock.
Figure 5E:
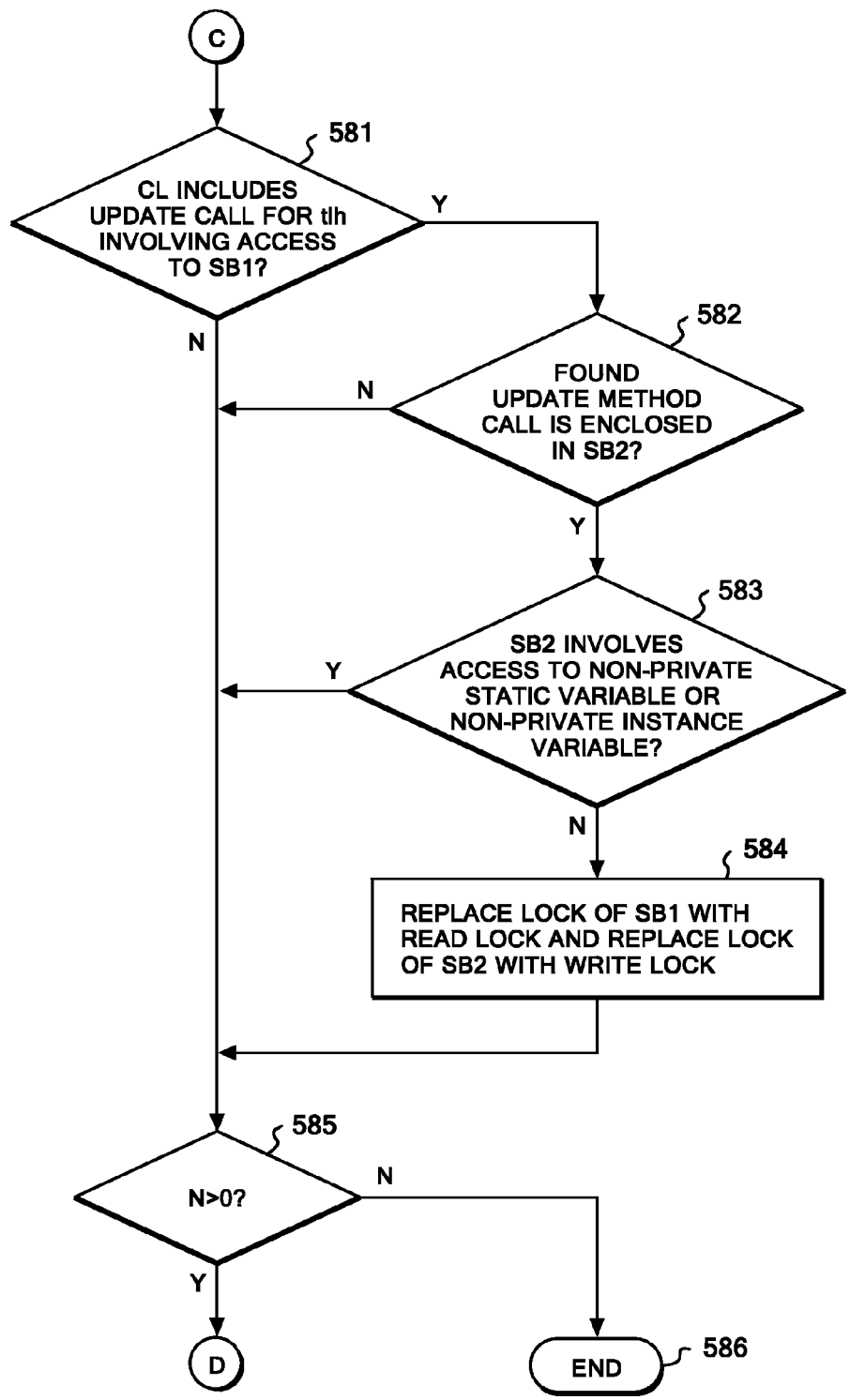
FIG. 5E shows a flow of the processing in step 503 in FIG. 5A according to the embodiment of the present invention, that is, under given requirements, the processing of replacing the lock of the block SB1 with the read lock, and also replacing the other synchronized block included in the block SB1 with the write lock.
Figure 5F:
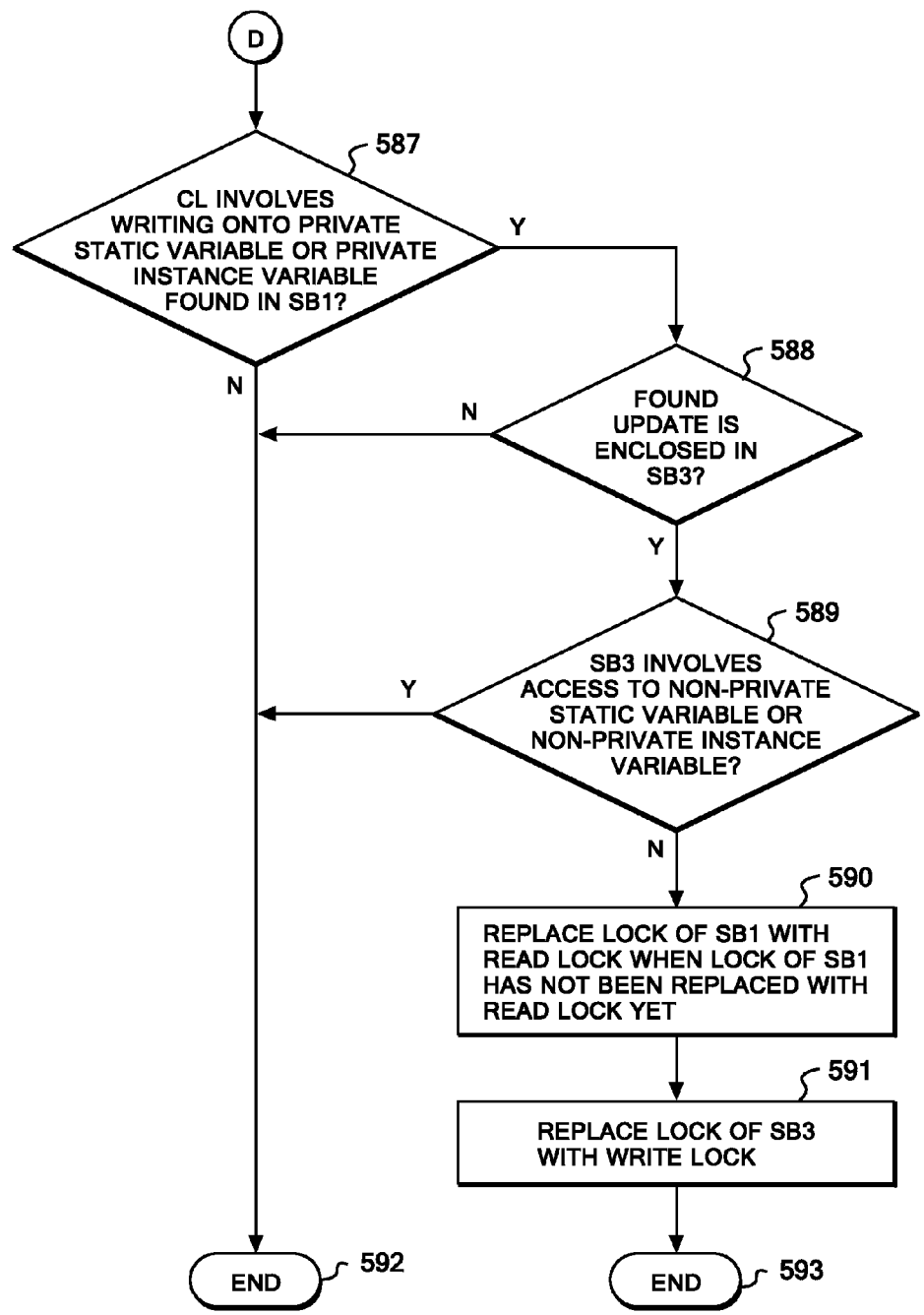
FIG. 5F shows a flow of the processing in step 503 in FIG. 5A according to the embodiment of the present invention, that is, under given requirements, the processing of replacing the lock of the block SB1 with the read lock, and also replacing the other synchronized block included in the block SB1 with the write lock.

Each of FIGS. 5D, 5E and 5F shows a detailed flow of the processing in step 503 in FIG. 5A according to the embodiment of the present invention, that is, the processing of replacing the lock of the block SB1 with a read lock, and also replacing another synchronized block included in the block SB1 with a write lock.

Hereinafter, steps 571 to 576 in FIG. 5D will be explained.

In step 571, the computer system (100) determines whether the SB1 involves an access to a non-private static variable or non-private instance variable. The computer system (100) checks whether the section enclosed in the SB1 includes code to access a non-private static variable or non-private instance variable. When the code to access is included, the processing goes to step 576, and then is terminated. Instead, when the code to access is not included, the processing goes to step 572.

In step 572, the computer system (100) determines whether the SB1 includes code to write onto a private static variable or private instance variable. The computer system (100) checks whether the section enclosed in the SB1 includes code to write onto the private static variable or the private instance variable. When the code to write is included, the processing goes to step 576, and then is terminated. Instead, when the code to write is not included, the processing goes to step 573.

In step 573, the computer system (100) counts the number of code units (M) of reference method calls belonging to the instance sc and being included in the section enclosed in the SB1. The reference method belonging to the instance cc is a method to retrieve a value shared among threads.

In step 574, the computer system (100) counts a total value (N) of the number of units of code to read a private static variable and the number of units of code to read a private instance variable in the section enclosed in the SB1.

In step 575, the computer system (100) determines whether M+N>=2 holds. The computer system (100) calculates M+N. When M+N is equal to or larger than 2, the processing goes to step 581. When M+N is equal to or smaller than 1, then the processing goes to step 576 and then is terminated.

Hereinafter, steps 581 to 586 in FIG. 5E will be explained.

In step 581, the computer system (100) determines whether the CL includes an update call in the SB1 involving an access to an instance tlh. The computer system (100) checks the whole code of the class including the SB1. When the code of the update method call belonging to the instance tlh included in the section enclosed in the SB1 is found in the CL as a result of the check, the processing goes to step 582. Instead, when the code is not found, the processing goes to step 585. Here, the update method call belonging to the instance tlh is tlh.put( ), for example.

In step 582, the computer system (100) determines whether the found update method call is enclosed in a second synchronized block (abbreviated as SB2 below). The computer system (100) checks whether the code of the found call is included in a section enclosed in the SB2. When the call is included, the processing goes to step 583. Instead, when the call is not included, the processing goes to step 585.

In step 583, the computer system (100) determines whether the SB2 involves an access to a non-private static variable or non-private instance variable. The computer system (100) checks whether the section enclosed in the SB2 includes code to access the non-private static variable or non-private instance variable. When the code to access is included, the processing goes to step 585. Instead, when the code to access is not included, the processing goes to step 584.

In step 584, the computer system (100) replaces the lock of the SB1 with the read lock. In addition, the computer system (100) replaces the lock of the SB2 with the write lock. Upon completion of the replacement, the processing goes to step 585.

In step 585, the computer system (100) makes a determination as to the total value (N) obtained in step 574. The processing goes to step 587 when N>0 holds, whereas the processing goes to step 586 and then is terminated when N>0 does not hold.

Hereinafter, steps 587 to 593 in FIG. 5F will be explained.

In step 587, the computer system (100) determines whether the CL involves writing onto the private static variable or private instance variable which is found in the SB1. The computer system (100) checks the whole code of the class including the SB1. When the checking finds that the CL includes code to update onto the private static variable or the private instance variable which is read in the section enclosed in the SB1, the processing goes to step 588. Instead, when the code to update is not found, the processing goes to step 592, and then is terminated.

In step 588, the computer system (100) determines whether the found update is enclosed in a third synchronized block (abbreviated as SB3 below). The computer system (100) checks whether the section enclosed in the SB3 includes the code of the found update. If the code of the found update is included in the SB3, the processing goes to step 589. If not, the processing goes to step 592, and then is terminated.

In step 589, the computer system (100) determines whether the SB3 involves an access to a non-private static variable or non-private instance variable. The computer system (100) checks whether the section enclosed in the SB3 includes code to access a non-private static variable or the non-private instance variable. When the code to access is included, the processing goes to step 592, and then is terminated. Instead, when the code to access is not included, the processing goes to step 590.

In step 590, the computer system (100) replaces the lock of the SB1 with the read lock when the lock of the SB1 has not been replaced with the read lock yet.

In step 591, the computer system (100) replaces the lock of the SB3 with the write lock.

Both of steps 592 and 593 are the end of step 503.

FIG. 6A shows a CL (class Y) that is the first Java code (108) in the memory (102) shown in FIG. 1.

FIG. 6B shows a CL (class Y) that is the second Java code (110) in the memory (102).

The following shows an example in which the CL (class Y) of the first Java code before conversion shown in FIG. 6A is converted into the CL (class Y) of the second Java code after conversion shown in FIG. 6B through the application of the conversion processing shown in FIG. 5A.

In FIG. 6A, the class Y does not include the inherited reserved word extends.

The class Y does not inherit a Hashtable class, and therefore does not satisfy the condition in step 201 in FIG. 2. In the class Y, the synchronized map class is declared (//Y00 in FIG. 6A), and a thread-specific value thread is used as a key (//Y05 in FIG. 6A, for example). Thus, the class Y satisfies the conditions in steps 203 and 204, and therefore is subjected to the conversion processing in steps in FIG. 5A.

In step 501 in FIG. 5A, "Thread Local tlh=new Thread Local( )" is declared as shown in the second line in FIG. 6B (//Y'00 in FIG. 6B). At the same time, the code (wrapped by the synchronized map wrapper of the collections class) to generate an instance sc by the hashmap on the second line in FIG. 6A (//Y00 in FIG. 6A) is deleted.

Subsequently, in step 502 in FIG. 5A, the lines //Y05, //Y10, //Y13 in FIG. 6A including the specific thread thread as the argument are rewritten. As a result, the lines //Y'05, //Y'10, //Y'13 in FIG. 6B are obtained. Then, the lines //Y04, //Y09 are deleted.

In FIG. 6A, no section is enclosed in a synchronized block, and therefore no code is to be written in step 503. Thus, the second Java code after conversion is the code shown in FIG. 6B.

Figure 7A:
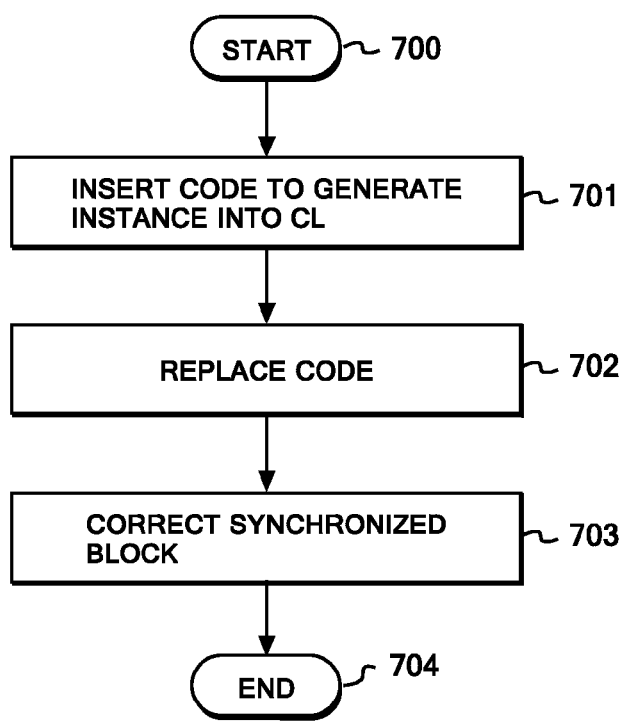
FIG. 7A is a detailed flow of the processing in step 206 in FIG. 2.

FIG. 7A is a detailed flow of the processing in step 206 in FIG. 2 according to the embodiment of the present invention. Step 206 in FIG. 2 is the processing of converting a synchronized map class into the corresponding concurrent map class.

Step 700 is the start of step 206 in FIG. 2.

In step 701, the computer system (100) replaces the code to generate an instance sc of a synchronized map class with the code to generate an instance of the corresponding concurrent map class. In this description, the concurrent map class is denoted by a class named concurrentMap, and the private variable to which the generated instance of the concurrent map class is to be assigned is denoted by sc. Moreover, the computer system (100) replaces the type declaration for the sc as needed.

In step 702, the computer system (100) rewrites the code of the CL. The computer system (100) rewrites code including a method call replaced in step 701 (the code called first code below), with code to atomically execute lock acquisition and lock release (the code called second code below). This rewriting will be described later with reference to FIGS. 7B to 7E.

In step 703, the computer system (100) corrects a synchronized block when any of methods replaced in steps 701 and 702 is enclosed in the synchronized block. This correction will be described later with reference to FIGS. 7F to 7J.

Note that step 702 and step 703 in FIG. 7A may be executed in any order.

Each of FIGS. 7B to 7E shows a detailed flow of the processing in step 702 in FIG. 7A according to the embodiment of the present invention.

In the following example, an 'if statement' is used as a conditional expression. The usable conditional expression is not limited to an 'if statement', but may include any reserved word prepared in a used language to make a determination. For example, a Switch statement may be used.

Figure 7B:
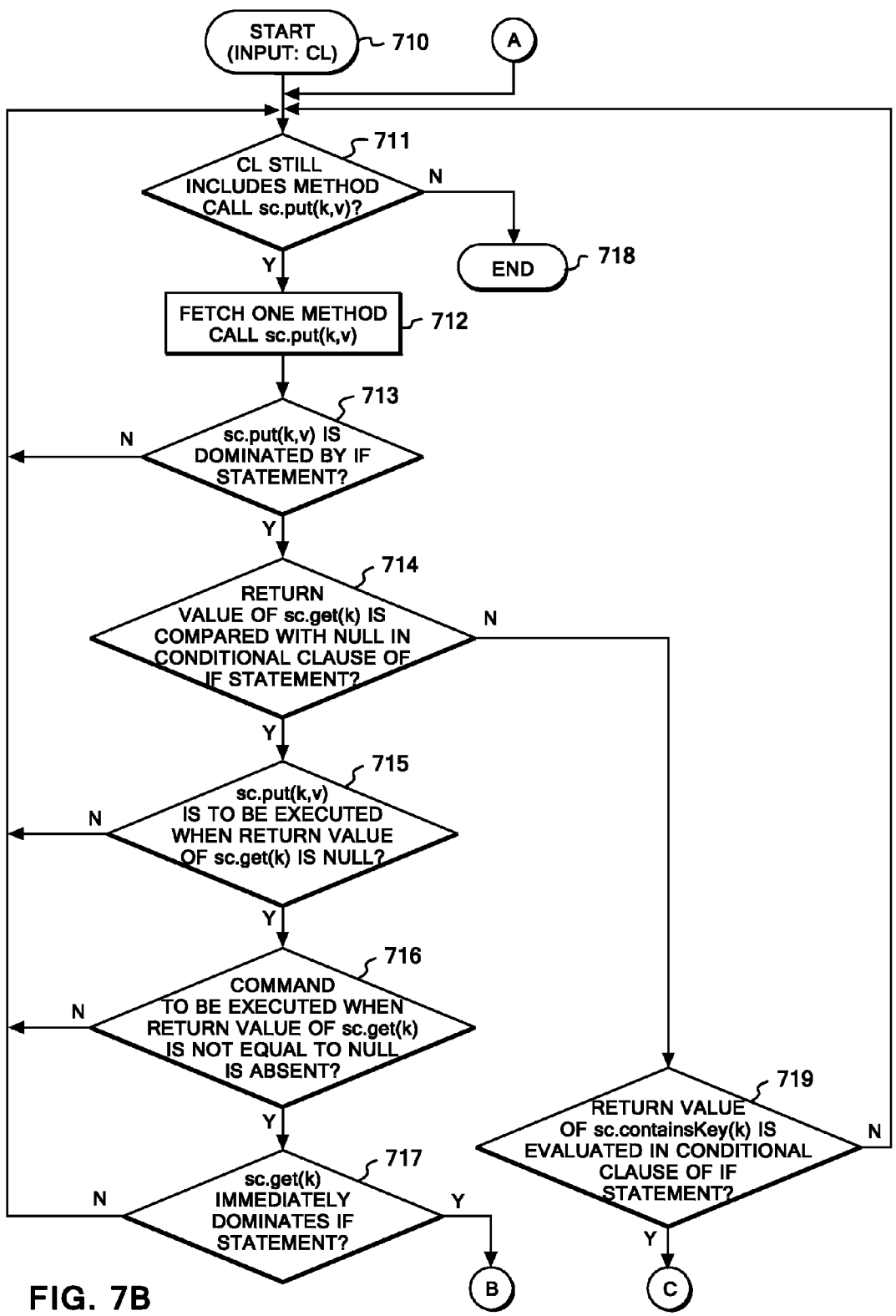
FIG. 7B shows a detailed flow of the processing in step 702 in FIG. 7A according to the embodiment of the present invention.

Hereinafter, steps 710 to 719 in FIG. 7B will be explained.

Step 710 is the start of step 702 in FIG. 7A.

In step 711, the computer system (100) determines whether the CL includes a method call sc.put(k,v). Here, the method put(k,v) is a method to store a value corresponding to a key value in the table of the concurrent map class while specifying the key value. Here, k denotes a certain variable in which a key value is to be stored, and v denotes a certain variable in which a value corresponding to the key value is to be stored. The method call sc.put(k,v) to be determined as included or not included is sc.put(k,v) yet to be taken out in the following step 712. If the CL includes sc.put(k,v), the processing goes to step 712. On the other hand, if the CL does not include sc.put(k,v), the processing goes to step 718 and then is terminated.

In step 713, the computer system (100) determines whether the above sc.put(k,v) is dominated by an 'if statement'. The situation in which sc.put(k,v) is dominated by an 'if statement' is that sc.put(k,v) is included in a part of code selectively controlled by the 'if statement'. When sc.put(k,v) is dominated by an 'if statement', the processing goes to step 714. On the other hand, when sc.put(k,v) is not dominated by an 'if statement', the processing turns back to step 711, and the processing for another sc.put(k,v) is started.

In step 714, the computer system (100) determines whether the return value of sc.get(k) is compared with null in the conditional clause of the 'if statement'. Here, the method get(k) is a method to retrieve a value corresponding to a key value k from the table of the concurrent Hashtable class while specifying the key value k. The situation in which the return value of sc.get(k) is compared with null in the 'if statement' is that "sc.get(k)==NULL", for example, is described in the conditional clause. When the return value of sc.get(k) is compared with null, the processing goes to step 715. Instead, when the return value of sc.get(k) is not compared with null, the processing goes to step 719.

In step 715, the computer system (100) determines whether sc.put(k,v) is to be executed when the return value of sc.get(k) is null. The situation in which sc.put(k,v) is to be executed if the return value is null is that the 'if statement' is "if(sc.get(k)==NULL){v=sc.put(k,v);}", for example. When sc.put(k,v) is to be executed, the processing goes to step 716. On the other hand, when sc.put(k,v) is not to be executed, the processing turns back to step 711, and the processing for another sc.put(k,v) is started.

In step 716, the computer system (100) determines whether there is absence of any command to be executed when the return value of sc.get(k) is not equal to null. The situation in which there is absence of any command to be executed if the return value is not equal to null is that the 'if statement' is "if(sc.get(k)==NULL){v=sc.put(k,v);}else{//nop}", for example. If a command to be executed is absent, the processing goes to step 717. On the other hand, if a command to be executed is not absent, the processing turns back to step 711, and the processing for another sc.put(k,v) is started.

In step 717, the computer system (100) determines whether sc.get(k) immediately dominates an 'if statement'. The situation in which sc.get(k) immediately dominates an 'if statement' is that sc.get(k) is executed, without fail, before the execution of the 'if statement', and where there is no command to executed, without fail, between the execution of sc.get(k) and the execution of the 'if statement'. If sc.get(k) immediately dominates the 'if statement', the processing goes to step 721. On the other hand, if sc.get(k) does not immediately dominate the 'if statement', the processing goes to step 711, and the processing for another sc.put(k,v) is started.

In step 719, the computer system (100) determines whether the return value of sc.containsKey(k) is evaluated in the conditional clause of an 'if statement'. The situation in which the return value of sc.containsKey(k) is evaluated is that "sc.containsKey(k)==FALSE" is written in the conditional clause, for example. Here, the method containsKey(k) is a method to return a value indicating whether a value corresponding to a key value k is included in the concurrent Hashtable class, while specifying the key value k. If the return value of sc.containsKey(k) is evaluated, the processing goes to step 731. Instead, if the return value is not evaluated, the processing turns back to step 711, and the processing for another sc.put(k,v) is started.

Figure 7C:
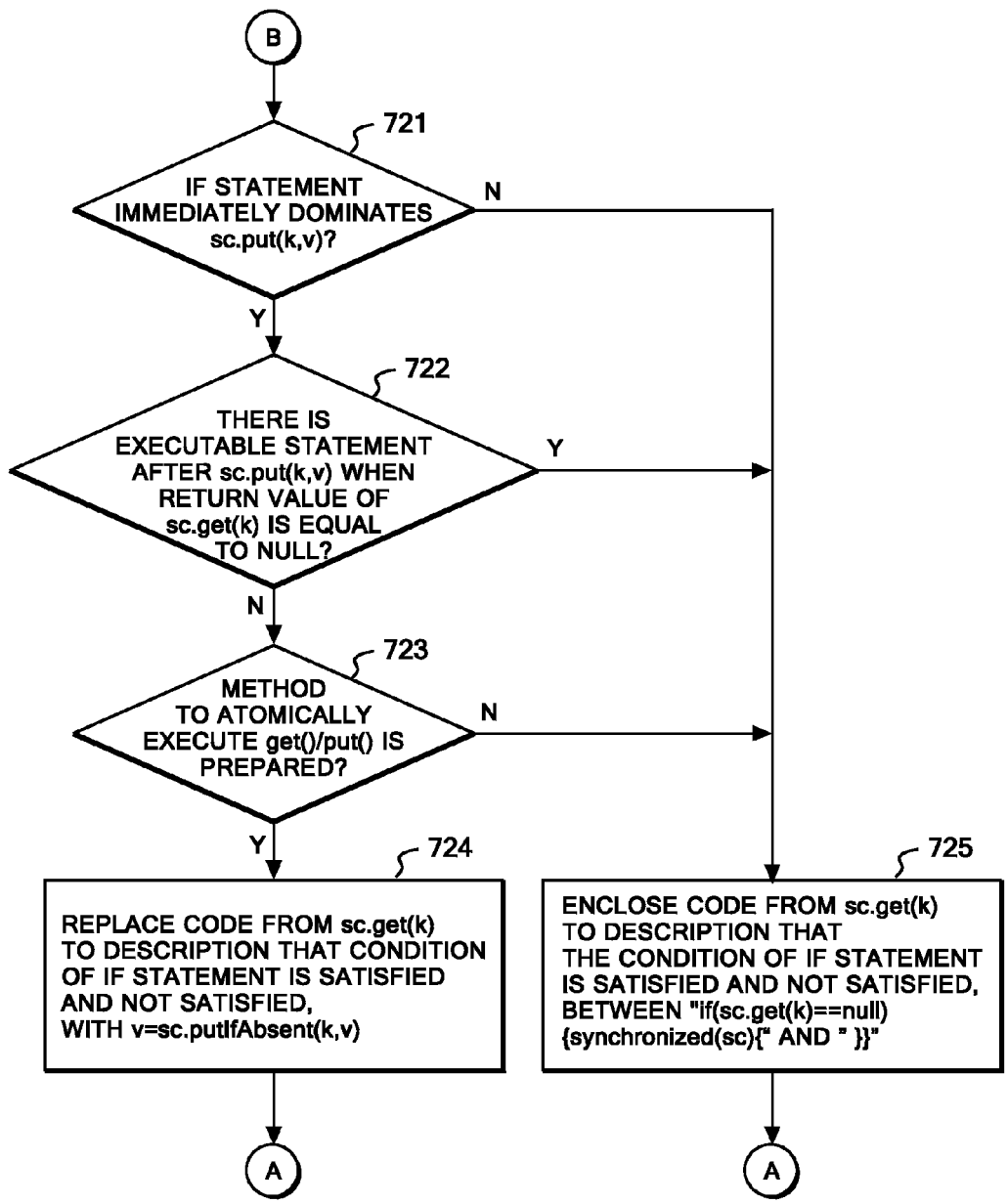
FIG. 7C shows a detailed flow of the processing in step 702 in FIG. 7A according to the embodiment of the present invention.

Hereinafter, steps 721 to 725 in FIG. 7C will be explained.

In step 721, the computer system (100) determines whether an 'if statement' immediately dominates sc.put(k,v). When the 'if statement' immediately dominates sc.put(k,v), the processing goes to step 722. Instead, when the 'if statement' does not immediately dominate sc.put(k,v), the processing goes to step 725.

In step 722, the computer system (100) determines whether there is an executable statement after sc.put(k,v) in the part of code executed when the return value of sc.get(k) is equal to null. When there is an executable statement after sc.put(k,v), the processing goes to step 725. Instead, when there is no executable statement after sc.put(k,v), the processing goes to step 723.

In step 723, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 724. Instead, when the method is not retrieved, the processing goes to step 725.

In step 724, the computer system (100) replaces, with v=sc.putIfAbsent(k,v), a part of code from sc.get(k) to code having description that the condition of the 'if statement' is satisfied and not satisfied. The method replaced here is the method retrieved by the search, that is, the method to atomically execute get( )/put( ). Upon completion of the replacement, the processing turns back to step 711, and the processing for another sc.put(k,v) is started.

In step 725, the computer system (100) encloses a part of code from sc.get(k) to code having description that the condition of the 'if statement' is satisfied and not satisfied, between "if(sc.get(k)==null){synchronized(sc){" and "}}". Upon completion of the replacement, the processing turns back to step 711, and the processing for another sc.put(k,v) is started.

Figure 7D:
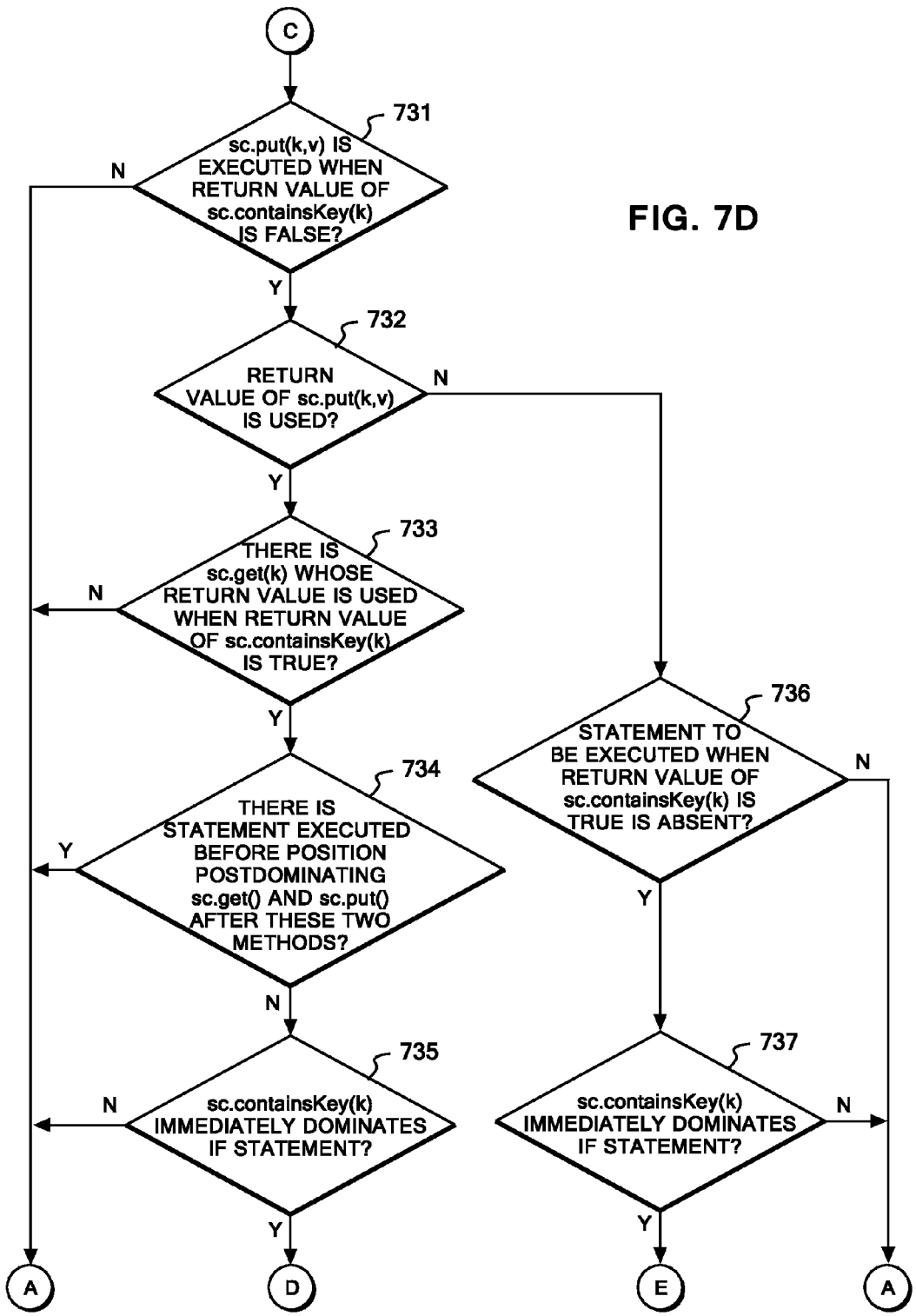
FIG. 7D shows a detailed flow of the processing in step 702 in FIG. 7A according to the embodiment of the present invention.

Hereinafter, steps 731 to 737 in FIG. 7D will be explained.

In step 731, the computer system (100) determines whether sc.put(k,v) is to be executed when the return value of sc.containsKey(k) is false. The situation in which sc.put(k,v) is to be executed when the return value of sc.containsKey(k) is false is that the 'if statement' is "if(sc.containsKey(k)==false){v=sc.put(k,v);}", for example. When sc.put(k,v) is to be executed, the processing goes to step 732. Instead, when sc.put(k,v) is not to be executed, the processing turns back to step 711, and the processing for another sc.put(k,v) is started.

In step 732, the computer system (100) determines whether the return value of sc.put(k,v) is used. When the return value of sc.put(k,v) is used in the CL, the processing goes to step 733. Instead, when the return value is not used, the processing goes to step 736.

In step 733, the computer system (100) determines whether there is sc.get(k) whose return value is used when the return value of sc.containsKey(k) is true. The situation in which there is sc.get(k) whose return value is used is that the CL includes code which uses the value v when the 'if statement' is "if(sc.containsKey(k)==true){v=sc.get(k);}", for example. When the CL includes sc.get(k) whose return value is used, the processing goes to step 734. Instead, when the CL does not include sc.get(k), the processing turns back to step 711, and the processing for another sc.put(k,v) is started.

In step 734, the computer system (100) determines whether there is a statement to be executed before a position of code postdominating sc.get( ) and sc.put( ) after these two methods. The position of code postdominating sc.get( ) and sc.put( ) after these two methods is the position of the code of a command to be executed in common to sc.get( ) and sc.put( ) for the first time, from among commands to be executed, without fail, after the execution of sc.get( ) and commands to be executed, without fail, after the execution of sc.put( ). When there is no statement to be executed, the processing goes to step 735. Instead, when there is a statement to be executed, the processing turns back to step 711, and the processing for another sc.put(k,v) is started.

In step 735, the computer system (100) determines whether sc.containsKey (k) immediately dominates an 'if statement'. The situation in which sc.containsKey(k) immediately dominates an 'if statement' is that sc.containsKey(k) is executed, without fail, before the execution of the 'if statement', and where there is not any command to be executed, without fail, after the execution of the sc.containsKey(k) and before the execution of the 'if statement'. When sc.containsKey(k) immediately dominates the 'if statement', the processing goes to step 741. Instead, when sc.containsKey(k) does not immediately dominate the 'if statement', the processing turns back to step 711, and the processing for another sc.put(k,v) is started.

In step 736, the computer system (100) determines whether there is absence of any statement to be executed when the return value of sc.containsKey(k) is true. The situation in which there is absence of any statement to be executed when the return value of sc.containsKey(k) is true is that the 'if statement' is "if(sc.containsKey(k)==true){//nop}", for example. When there is no statement to be executed, the processing goes to step 737. Instead, when there is a statement to be executed, the processing turns back to step 711, and the processing for another sc.put(k,v) is started.

In step 737, the computer system (100) determines whether sc.containsKey(k) immediately dominates an 'if statement'. When sc.containsKey(k) immediately dominates an 'if statement', the processing goes to step 746. Instead, when sc.containsKey(k) does not immediately dominate any 'if statement', the processing turns back to step 711, and the processing for another sc.put(k,v) is started.

Figure 7E:
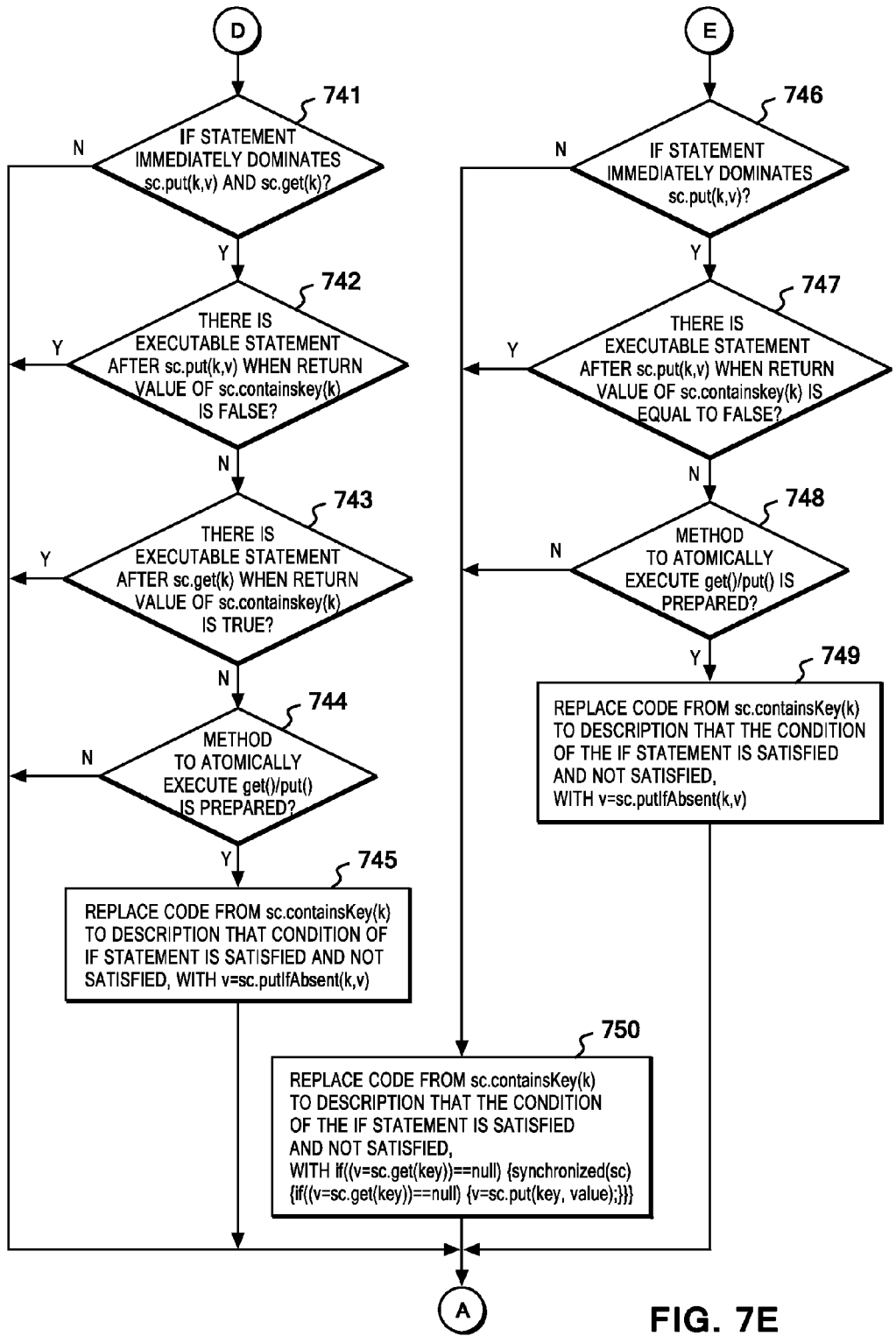
FIG. 7E shows a detailed flow of the processing in step 702 in FIG. 7A according to the embodiment of the present invention.

Hereinafter, steps 741 to 750 in FIG. 7E will be explained.

In step 741, the computer system (100) determines whether an 'if statement' immediately dominates sc.put(k,v) and sc.get(k). When the 'if statement' immediately dominates sc.put(k,v) and sc.get(k), the processing goes to step 742. Instead, when the 'if statement' does not immediately dominate sc.put(k,v) and sc.get(k), the processing turns back to step 711, and the processing for another sc.put(k,v) is started.

In step 742, the computer system (100) determines whether there is an executable statement after sc.put(k,v) in the part of code executed when the return value of sc.containskey(k) is equal to false. When there is an executable statement after sc.put(k,v), the processing turns back to step 711, and the processing for another sc.put(k,v) is started. Instead, when there is no executable statement after sc.put(k,v), the processing goes to step 743.

In step 743, the computer system (100) determines whether there is an executable statement after sc.get(k) in the part of code executed when the return value of sc.containskey(k) is true. When there is an executable statement after sc.get(k,v), the processing turns back to step 711, and the processing for another sc.put(k,v) is started. Instead, when there is no executable statement after sc.get(k,v), the processing goes to step 744.

In step 744, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 745. Instead, when the method is not retrieved, the processing turns back to step 711, and the processing for another sc.put(k,v) is started.

In step 745, the computer system (100) replaces, with v=sc.putIfAbsent(k,v), a part of code from sc.containsKey(k) to code having description that the condition of the 'if statement' is satisfied and not satisfied. The method replaced here is the method retrieved by the search, that is, the method to atomically execute get( )/put( ). Upon completion of the replacement, the processing turns back to step 711, and the processing for another sc.put(k,v) is started.

In step 746, the computer system (100) determines whether an 'if statement' immediately dominates sc.put(k,v). When the 'if statement' immediately dominates sc.put(k,v), the processing goes to step 747. Instead, when the 'if statement' does not immediately dominate sc.put(k,v), the processing goes to step 750.

In step 747, the computer system (100) determines whether there is an executable statement after sc.put(k,v) in the part of code executed when the return value of sc.containskey(k) is equal to false. When there is an executable statement after sc.put(k,v), the processing goes to step 750. Instead, when there is no executable statement after sc.put(k,v), the processing goes to step 748.

In step 748, the computer system (100) determines whether a method to atomically execute get( )/put( ) is prepared. The computer system (100) searches the correspondence table (107) by using a class name (java.util.Hashtable), for example. When the method to atomically execute get( )/put( ) is retrieved as a result of the search, the processing goes to step 749. Instead, when the method is not retrieved, the processing goes to step 750.

In step 749, the computer system (100) replaces, with v=sc.putIfAbsent(k,v), a part of code from sc.containsKey(k) to code having description that the condition of the 'if statement' is satisfied and not satisfied. The method replaced here is the method retrieved by the search, that is, the method to atomically execute get( )/put( ). Upon completion of the replacement, the processing turns back to step 711, and the processing for another sc.put(k,v) is started.

In step 750, the computer system (100) replaces a part of code from sc.containsKey(k) to code having description that the condition of the 'if statement' is satisfied and not satisfied, with if((v=sc.get(key))==null) {synchronized(sc) {if ((v=sc.get(key))==null) {v=sc.put(key, value);}}}. Upon completion of the replacement, the processing turns back to step 711, and the processing for another sc.put(k,v) is started.

Each of FIGS. 7F to 7J shows a detailed flow of the processing in step 703 in FIG. 7A according to the embodiment of the present invention.

In the following explanation of FIGS. 7F to 7J, SB1, SB2 and SB3 denote different synchronized blocks, respectively.

In step 703, the computer system (100) corrects a synchronized block (called SB1 below). The computer system (100) performs each step of the following processing (FIGS. 7F to 7J).

Figure 7F:
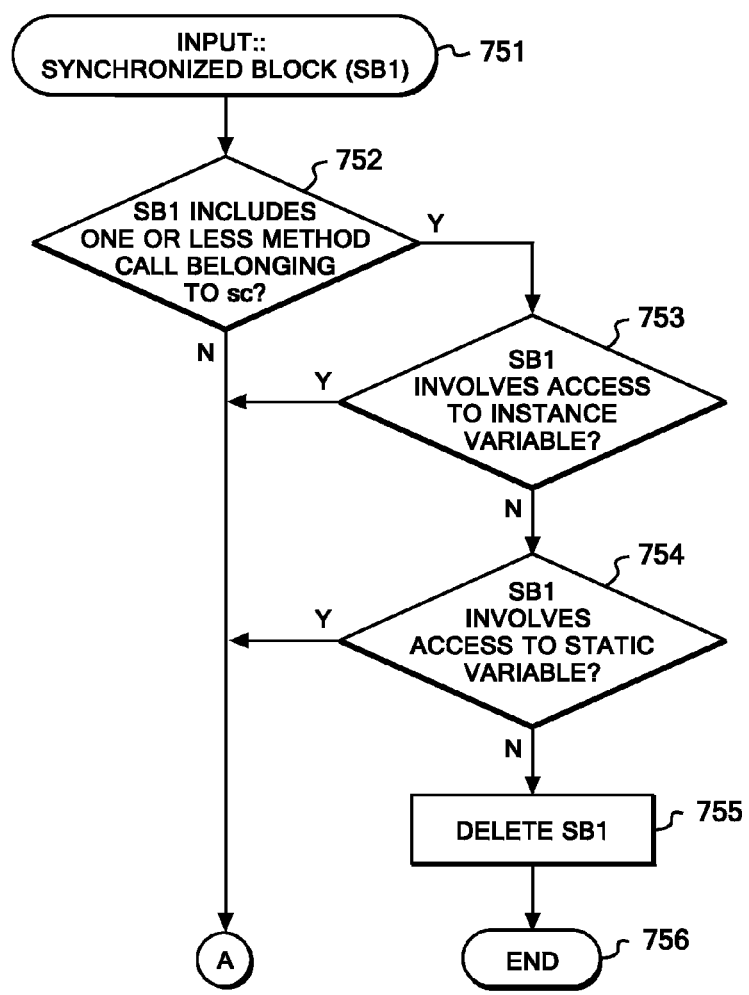
FIG. 7F shows a flow of the processing in step 703 in FIG. 7A in the embodiment of the present invention, that is, the processing of deleting the SB1 under given requirements.

FIG. 7F shows a flow of the processing in step 703 in FIG. 7A in the embodiment of the present invention. Specifically, FIG. 7F shows the processing of deleting the SB1 under given requirements.

Step 751 is the start of the step 703 in FIG. 7A.

In step 752, the computer system (100) determines whether the SB1 includes one or less method call belonging to the instance sc of the concurrent map class. Here, "one or less method is included" means that "one method call or no method call is included." At this time, the computer system (100) does not count, as one code unit of a method call, the code of each of method calls belonging to the instance sc and being included in the rewriting result of the aforementioned step 702, but counts, as one code unit, the whole code of all the method calls belonging to the instance sc and being included in the rewriting result.

When the number of code units of method calls thus counted is one or less, the processing goes to step 753. Instead, when the number of code units of method calls thus counted is two or more, the processing goes to step 761.

In step 753, the computer system (100) determines whether the SB1 involves an access to an instance variable. The computer system (100) checks whether a section enclosed in SB1 includes code to access an instance variable. When the code to access an instance variable is included, the processing goes to step 761. Instead, when the code to access an instance variable is not included, the processing goes to step 754.

In step 754, the computer system (100) determines whether the SB1 involves an access to a static variable. The computer system (100) checks whether the section enclosed in the SB1 includes code to access a static variable. When the code to access a static variable is included, the processing goes to step 761. Instead, when the code to access a static variable is not included, the processing goes to step 755.

In step 755, the computer system (100) deletes the SB1. The deletion mentioned here is deleting the description of the SB1 from the code, or changing the description thereof into an annotation. The changing of the description thereof into an annotation means to put the described processing into a non-executable state. Upon completion of the lock deletion, the processing goes to step 756, and step 703 is terminated.

The processing in steps 751 to 755 reduces the frequency of lock contentions.

Figure 7G:
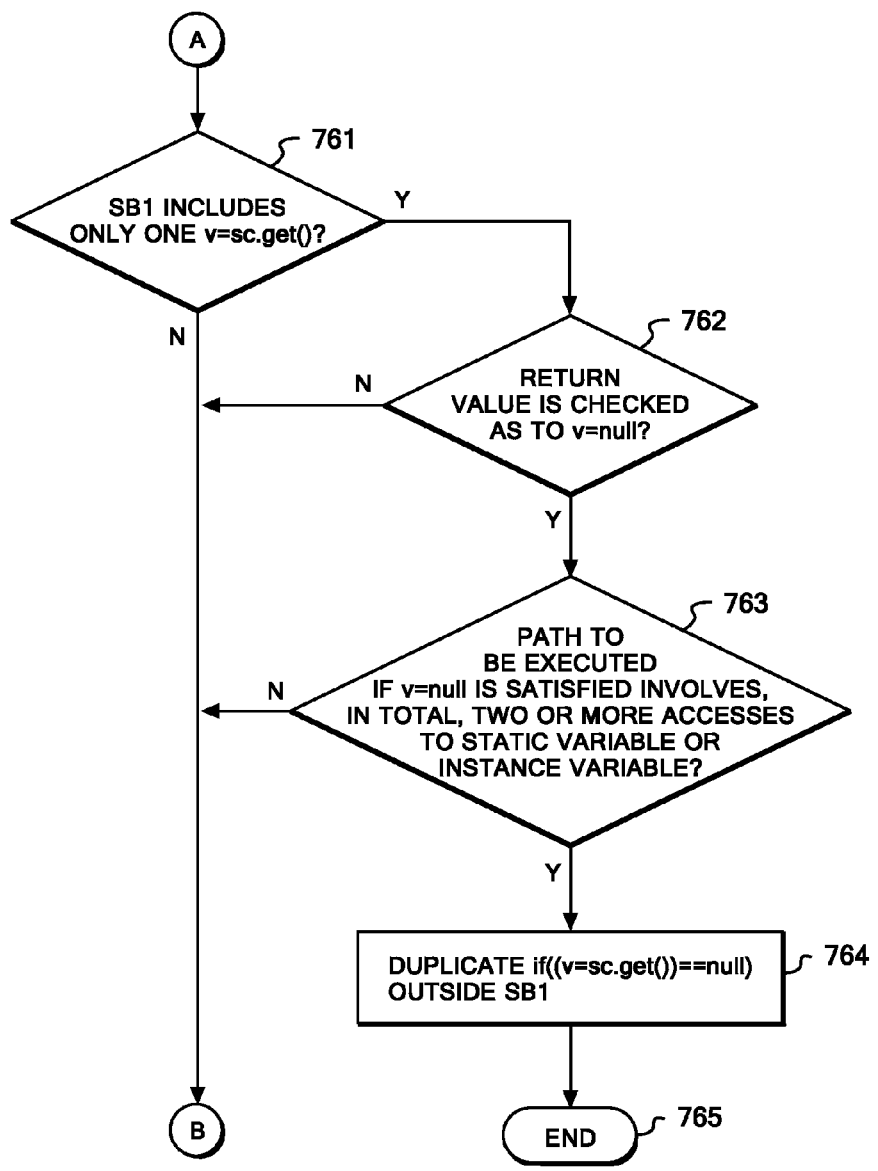
FIG. 7G shows a flow of the processing in step 703 in FIG. 7A according to the embodiment of the present invention, that is, the processing of deleting the SB1 under given requirements and further performing code conversion accompanied by the deletion.

FIG. 7G shows a flow of the processing in step 703 in FIG. 7A according to the embodiment of the present invention, that is, the processing of deleting the SB1 under given requirements and further performing code conversion accompanied by the deletion.

In step 761, the computer system (100) determines whether the SB1 includes only one v=sc.get( ). The computer system (100) counts the number of code units of get method calls (v=sc.get( )) from the instance sc enclosed in the SB1. Here, v denotes the return value of the get method. The get method may include a certain argument. When there is one get method, the processing goes to step 762. Instead, when there are zero, two or more get methods, the processing goes to step 771.

In step 762, the computer system (100) determines whether the return value v is checked as to v=null. The computer system (100) checks whether the section enclosed in the SB1 includes code of null check for the return value v. The null check is indicated by if(v==null), for example. When the code of the null check is included, the processing goes to step 763. Instead, when the code of the null check is not included, the processing goes to step 771.

In step 763, the computer system (100) determines whether the path to be executed if v=null is satisfied involves, in total, two or more accesses to a static variable or instance variable. The computer system (100) checks the code inside the path to be executed if the return value is determined as null in the null check. Assuming that the null check is if(v==null), for example, the path is a section enclosed in the if block. When the path includes two or more units of code to access the instance variable or static variable in total, the processing goes to step 764. Instead, when the path includes zero or one unit of code to access, the processing goes to step 771.

In step 764, the computer system (100) duplicates if((v=sc.get( )==null) outside the SB1. Upon completion of the duplication processing, the processing goes to step 765 which is the end of step 703.

The processing in steps 761 to 765 reduces a time of lock contention.

Figure 7H:
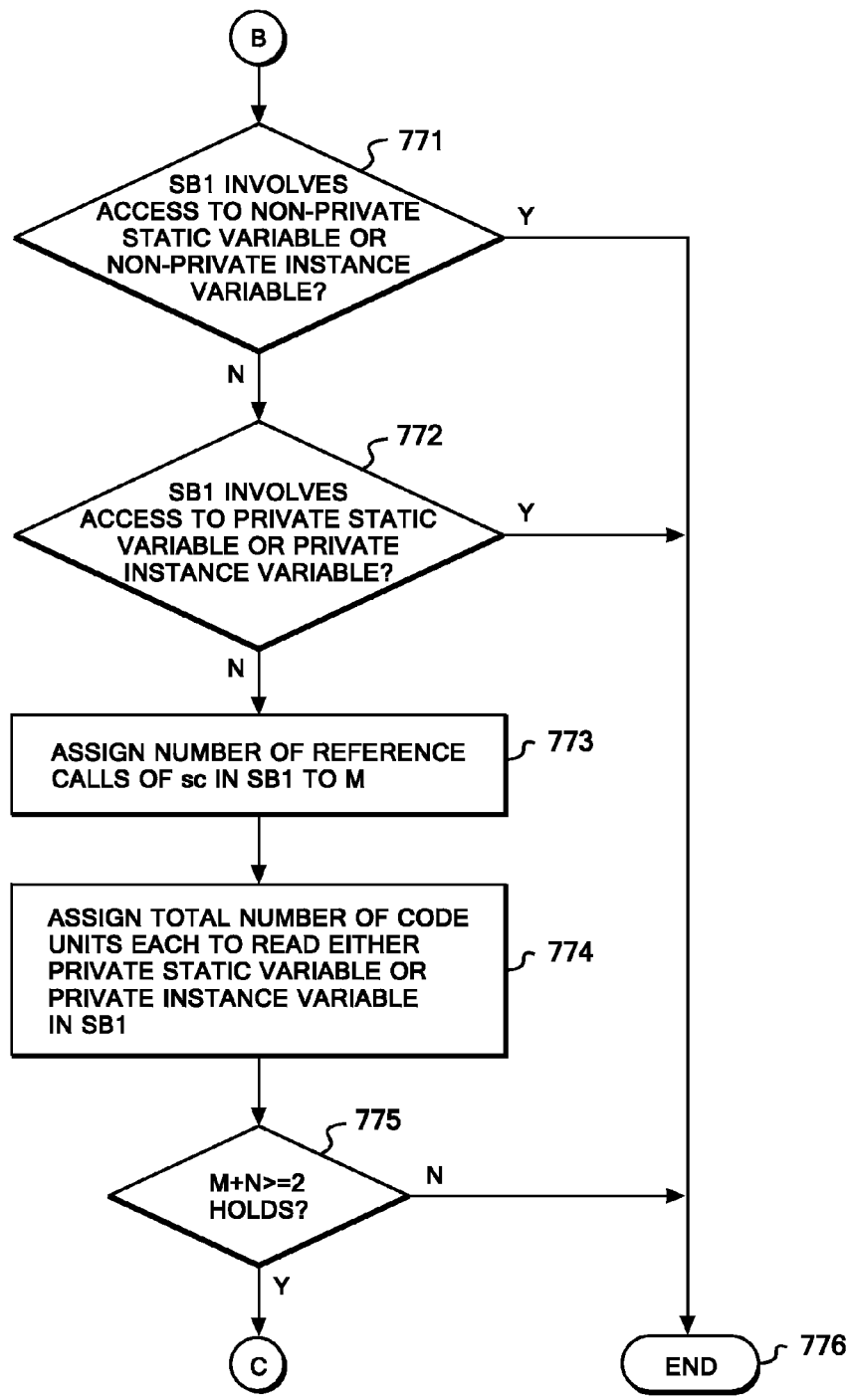
FIG. 7H shows a flow of the processing in step 703 in FIG. 7A according to the embodiment of the present invention, that is, under given requirements, the processing of replacing the lock of the block SB1 with a read lock, and also replacing another synchronized block included in the block SB1 with a write lock.
Figure 7I:
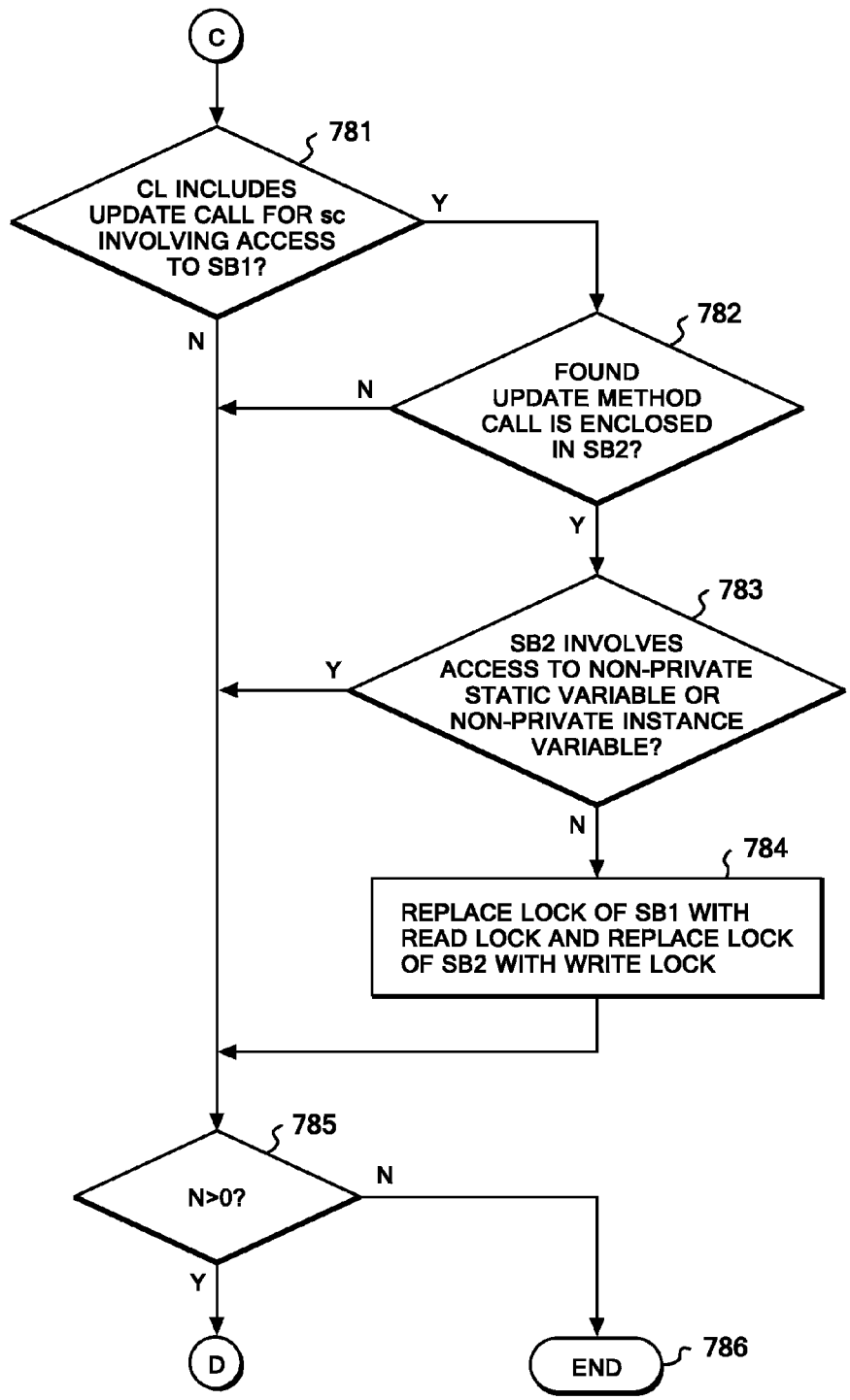
FIG. 7I shows a flow of the processing in step 703 in FIG. 7A according to the embodiment of the present invention, that is, under given requirements, the processing of replacing the lock of the block SB1 with the read lock, and also replacing the other synchronized block included in the block SB1 with the write lock.
Figure 7J:
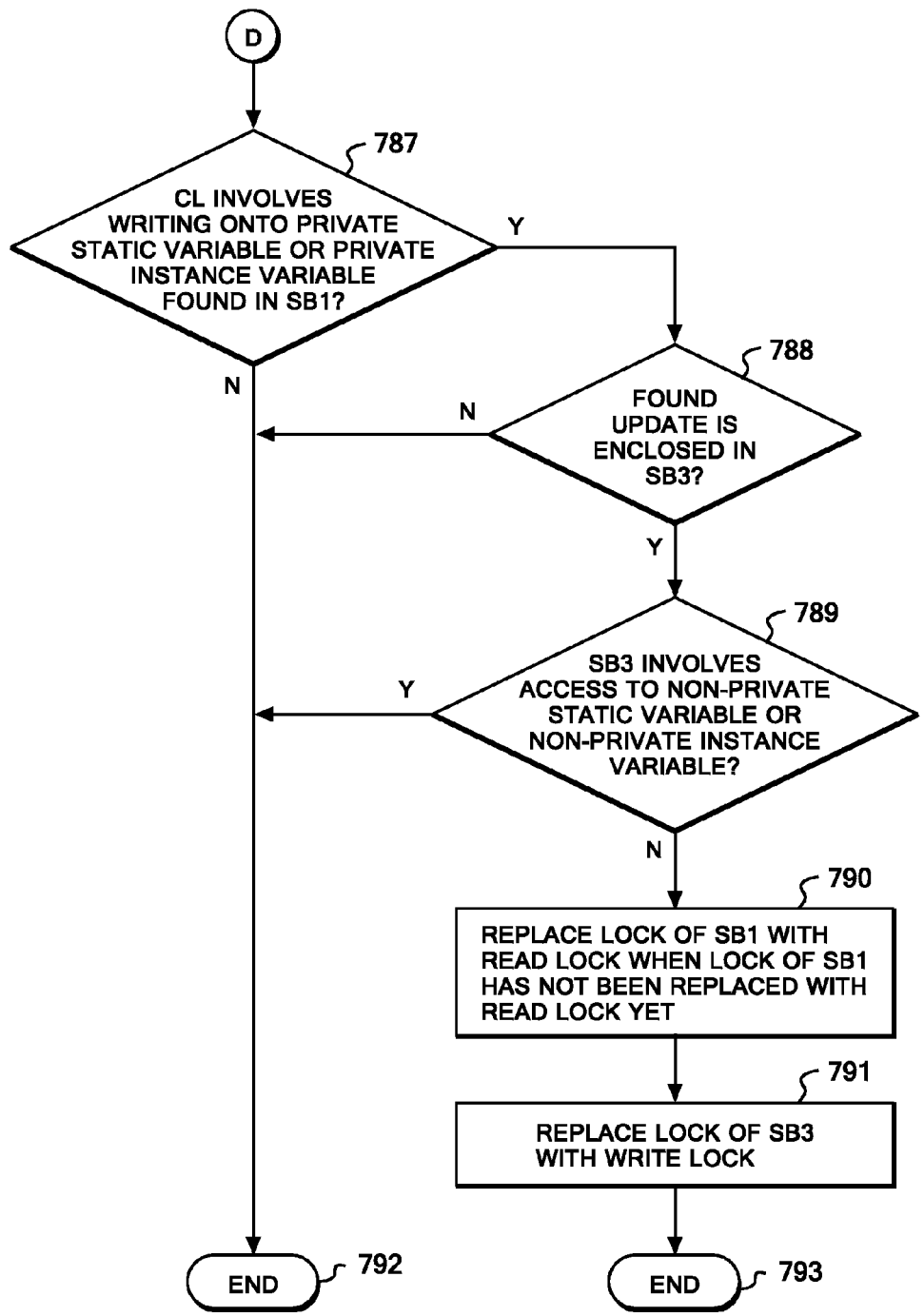
FIG. 7J shows a flow of the processing in step 703 in FIG. 7A according to the embodiment of the present invention, that is, under given requirements the processing of replacing the lock of the block SB1 with the read lock, and also replacing the other synchronized block included in the block SB1 with the write lock.

Each of FIGS. 7H, 7I and 7J shows a flow of the processing in step 703 in FIG. 7A according to the embodiment of the present invention, that is, the processing of replacing the lock of the block SB1 with a read lock, and also replacing another synchronized block included in the block SB1 with a write lock.

Hereinafter, steps 771 to 776 in FIG. 7H will be explained.

In step 771, the computer system (100) determines whether the SB1 involves an access to a non-private static variable or non-private instance variable. The computer system (100) checks whether the section enclosed in the SB1 includes code to access a non-private static variable or non-private instance variable. When the code to access is included, the processing goes to step 776, and then is terminated. Instead, when the code to access is not included, the processing goes to step 772.

In step 772, the computer system (100) determines whether the SB1 includes code to write onto a private static variable or private instance variable. The computer system (100) checks whether the section enclosed in the SB1 includes code to write onto a private static variable or private instance variable. When the code to write is included, the processing goes to step 776, and then is terminated. Instead, when the code to write is not included, the processing goes to step 773.

In step 773, the computer system (100) counts the number of code units (M) of reference method calls included in the section enclosed in the SB1 and belonging to an instance sc. The reference method belonging to the instance sc is a method to retrieve a value shared among threads.

In step 774, the computer system (100) counts a total value (N) of the number of units of code to read a private static variable and the number of units of code to read a private instance variable in the section enclosed in the SB1.

In step 775, the computer system (100) determines whether M+N>=2 holds. The computer system (100) calculates M+N. When M+N is equal to or larger than 2, the processing goes to step 781. When M+N is equal to or smaller than 1, then the processing goes to step 776 and then is terminated.

Hereinafter, steps 781 to 786 in FIG. 7I will be explained.

In step 781, the computer system (100) determines whether the CL includes an update call in the SB1 involving an access to the instance sc. The computer system (100) checks the whole code of the class including the SB1. When the code of the update method call belonging to the instance sc included in the section enclosed in the SB1 is found in the CL as a result of the check, the processing goes to step 782. Instead, when the code is not found, the processing goes to step 785. Here, the update method call belonging to the instance sc is sc.put( ), for example.

In step 782, the computer system (100) determines whether the found update method call is enclosed in a second synchronized block (abbreviated as SB2 below). The computer system (100) checks whether the code of the found call is included in a section enclosed in the SB2. When the call is included, the processing goes to step 783. Instead, when the call is not included, the processing goes to step 785.

In step 783, the computer system (100) determines whether the SB2 involves an access to a non-private static variable or non-private instance variable. The computer system (100) checks whether the section enclosed in the SB2 includes code to access the non-private static variable or non-private instance variable. When the code to access is included, the processing goes to step 785. Instead, when the code to access is not included, the processing goes to step 784.

In step 784, the computer system (100) replaces the lock of the SB1 with the read lock. In addition, the computer system (100) replaces the lock of the SB2 with the write lock. Upon completion of the replacement, the processing goes to step 785.

In step 785, the computer system (100) makes a determination as to the total value (N) obtained in step 774. The processing goes to step 787 when N>0 holds, whereas the processing goes to step 786 and then is terminated when N>0 does not hold.

Hereinafter, steps 787 to 793 in FIG. 7J will be explained.

In step 787, the computer system (100) determines whether the CL involves writing onto the private static variable or private instance variable which is found in the SB1. The computer system (100) checks the whole code of the class including the SB1. When the checking finds that the CL includes code to update the private static variable or the private instance variable which is read in the section enclosed in the SB1, the processing goes to step 788. Instead, when the code to update is not found, the processing goes to step 792, and then is terminated.

In step 788, the computer system (100) determines whether the found update is enclosed in a third synchronized block (abbreviated as SB3 below). The computer system (100) checks whether the code of the found update is included in a section enclosed in the SB3.

If the code of the found update is included in the SB3, the processing goes to step 789. If not, the processing goes to step 792, and then is terminated.

In step 789, the computer system (100) determines whether the SB3 involves an access to a non-private static variable or non-private instance variable. The computer system (100) checks whether the section enclosed in the SB3 includes code to access the non-private static variable or the non-private instance variable. When the code to access is included, the processing goes to step 792, and then is terminated. Instead, when the code to access is not included, the processing goes to step 790.

In step 790, the computer system (100) replaces the lock of the SB1 with the read lock when the lock of the SB1 has not been replaced with the read lock yet.

In step 791, the computer system (100) replaces the lock of SB3 with the write lock.

Both of 792 and 793 are the end of step 703.

Figure 8A:
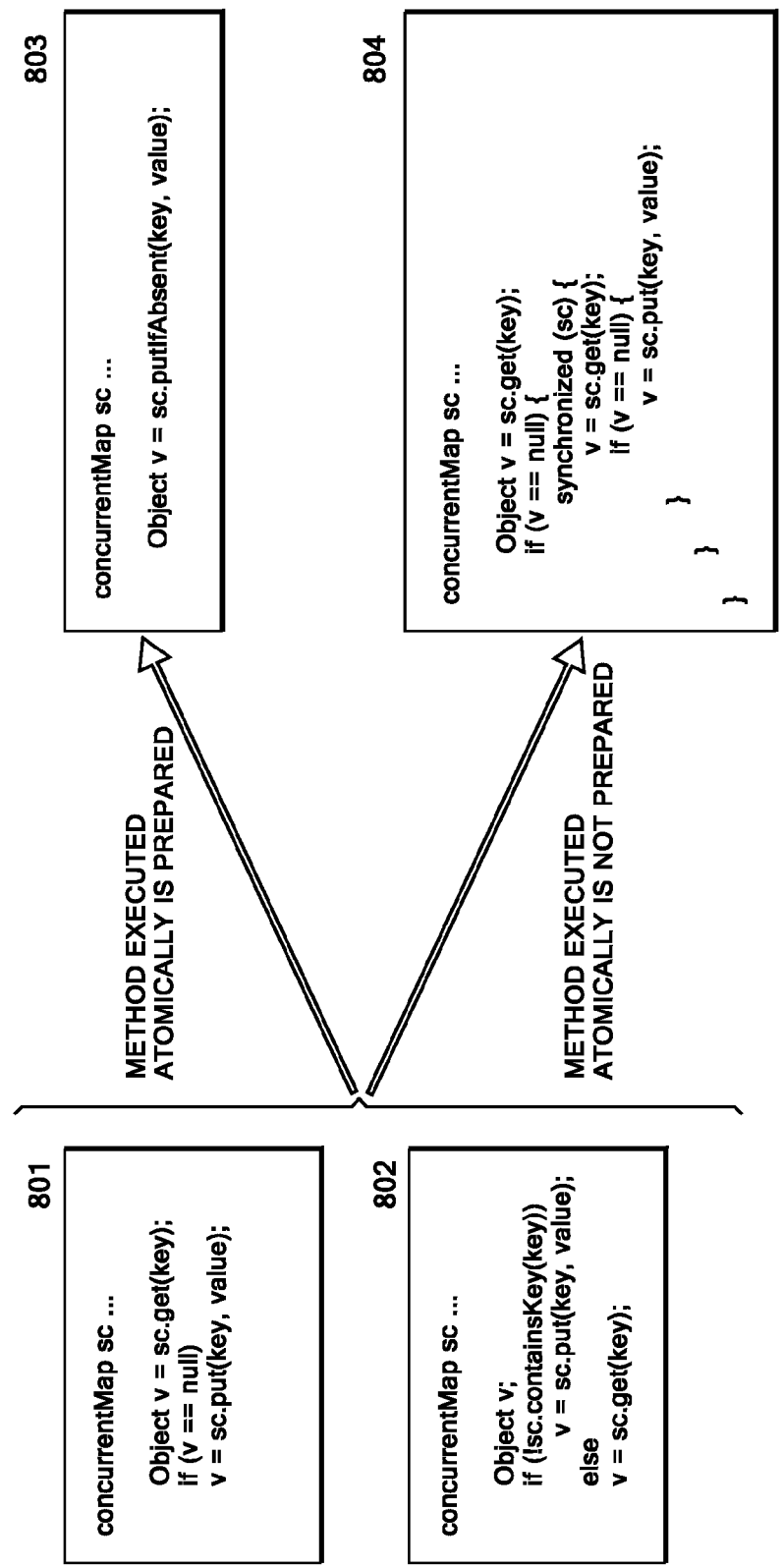
FIG. 8A shows an example of code conversion in step 702 in FIG. 7A according to the embodiment of the present invention.

FIG. 8A shows an example of code conversion in step 702 in FIG. 7A according to the embodiment of the present invention.

FIG. 8A shows a correspondence between the first code and the second code. Code (801) and code (802) are examples of the first code, whereas code (803) and code (804) are examples of the second code.

The computer system (100) performs the processing in step 702 in FIG. 7A (more specifically, steps in FIGS. 7B to 7E) on each of the code (801) and code (802). Through the processing, the code (801) and code (802) are rewritten to either of the code (803) and code (804). Here, When the instance sc is an instance of the concurrent Hashtable class having a putIfAbsent( ) method to atomically execute a pair of methods (get( )/put( )), the code (801) and code (802) are converted into the code (803) through the processing. When the instance sc is an instance of the concurrent Hashtable class having no putIfAbsent( ) method, the code (801) and code (802) are converted into the code (804).

FIG. 8B shows a CL (class Z) that is the first Java code (108) before conversion in the memory (102) shown in FIG. 1 according to the embodiment of the present invention.

FIG. 8C shows a CL (class Z) that is the second Java code (110) after conversion in the memory (102) shown in FIG. 1 according to the embodiment of the present invention.

The following shows an example in which the CL (class Z) of the first Java code before conversion shown in FIG. 8B is converted into the CL (class Z) of the second Java code after conversion shown in FIG. 8C through the application of the conversion processing shown in FIG. 7A.

The class Z does not includes the inherited reserved word extends in the class declaration in the first line, and thus does not satisfy the condition in step 201 in FIG. 2. In addition, not using a thread-specific value as a key, the class Z also does not satisfy the condition in step 204 in FIG. 2. The class Z, however, satisfies the condition in step 203, and therefore is subjected to the processing in step 206. The processing in step 206 is performed in the following procedure.

In accordance with step 701, the computer system (100) replaces "Hashtable ht=new Hashtable( );" (//Z01) in FIG. 8B with "ConcurrentMap ht=new ConcurrentMap( );" (//Z'01) in FIG. 8C.

This CL does not include code to be replaced in step 702.

In step 703, the following conversions are performed. Since the section enclosed in a synchronized block (//Z07 to //Z12) includes two reference method calls (ht.keys( ) and ht.get( )) to an instance variable ht generated from the synchronized class, the synchronized block is replaced with the read lock. In addition, an update method call for the instance ht is included in the line //Z03, the synchronized block is replaced with the write lock. FIG. 8C shows a result of these conversions.

FIG. 9 shows an example of performance comparison between programs before and after the application of code conversion according to the embodiment of the present invention.

FIG. 9 shows comparison results in items of the throughput, the CPU usage and the performance improvement rate. WebSphere Enterprise Service Bus 6.1 (trademark) and Java Developers Kit (trademark) were used for the Java runtime environment for this performance comparison, and the performance comparison was executed on a Niagara2 (trademark) processor (CPU including 64 hardware threads) of SUN (trademark).

The foregoing explanation shows that code can be automatically converted by using the present invention. In addition, by implementing the aforementioned automatic conversion in Integrated Development Environment (IDE), the present invention also makes it possible to inform a user of the possibility that a problem of lock contention, for example, may occur in code written by the user when the code is executed on multi-thread operation. Alternatively, the aforementioned automatic conversion of the present invention can be implemented in IDE in such a way as to present candidates for code after conversion (that is, provide a feedback) to the user, instead of automatically generating the code after conversion.

Figure 10:
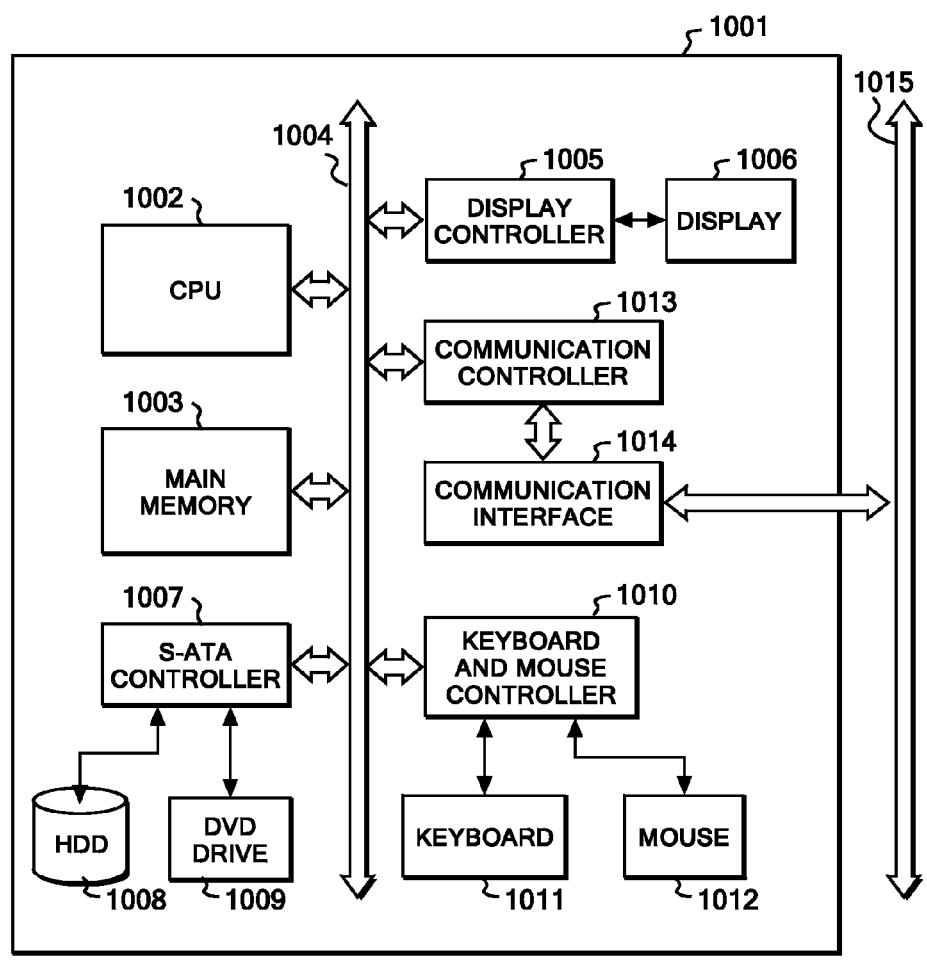
FIG. 10 shows a block diagram of computer hardware included in the system in FIG. 1 according to the embodiment of the present invention.

FIG. 10 shows a block diagram of computer hardware included in the system in FIG. 1 according to the embodiment of the present invention.

A computer system (1001) according to an embodiment of the present invention includes a CPU (1002) and a main memory (1003) which are connected to a bus (1004). The CPU (1002) is preferably based on the architecture of 32 bits or 64 bits. Processors usable as the CPU (1002) are, for example, processors of Xeon (trademark) series, Core (trademark) series, Atom (trademark) series, Pentium (trademark) series, and Celeron (trademark) series manufactured by Intel Corporation, processors of Phenom (trademark) series, Athlon (trademark) series, Turion (trademark) series and Sempron (trademark) series manufactured by Advanced Micro Devices, Inc., and other equivalent processors. A display (1006) such as a LCD monitor is connected to the bus (1004) through a display controller (1005). The display (1006) is used to display information on the computer system connected to a network through a communication line and information on software running on the computer system on an appropriate graphic interface for the purpose of managing the computer system. Moreover, a hard disk or silicon disk (1008) and a CD-ROM, a DVD drive or Blu-ray drive (1009) are connected to the bus (1004) through an IDE or SATA controller (1007).

In the hard disk (1008), data and programs such as an operating system, a program providing a Java (trademark) platform such as J2EE, and other programs are stored so as to be loadable to the main memory (1003).

The CD-ROM, DVD or Blu-ray drive (1009) is used to additionally install a program onto the hard disk (1008) from a CD-ROM, DVD-ROM or Blu-ray disk according to needs. In addition, a keyboard (1011) and a mouse (1012) are also connected to the bus (1004) through a keyboard and mouse controller (1010).

A communication interface (1014) complies with Ethernet (trademark) protocol, for example. The communication interface (1014) is connected to the bus (1004) through a communication controller (1013), plays a role in physically connecting the computer system and a communication line (1015), and provides a network interface layer to TCP/IP communication protocol of a communication function of the operating system of the computer system. Incidentally, the communication line may be of a wired LAN environment or a wireless LAN environment based on a wireless LAN connection standard such as IEEE802.11a/b/g/n, for example.

What is claimed is:

1. A method of converting a first program code in a multithreaded program into a second program code which causes less lock contention, the method comprising the steps of:

loading the first program code from a storage unit into a memory using a processing unit;

determining, using the processing unit, whether the first program code includes either (i) a first class having a method call to a class that operates while taking synchronization by locking, or (ii) a second class inheriting a parent class that operates while taking synchronization by locking;

in response to the determination that the first program code includes the first class, converting, using the processing unit, the first class having the method call to a third class that operates while taking synchronization by locking, into a class having a first method call to a concurrent operation executable fourth class that has a functionality equivalent to that of the third class, and having a shorter lock holding section than the third class; and in response to the determination that the first program code includes the second class, converting, using the processing unit, the second class having a method call to the parent class, into a class having a second method call to a concurrent operation executable class that has a functionality equivalent to that of the parent class, and having a shorter lock holding section than the second class, wherein:

if code including the class having the first method call is enclosed in a first synchronized block code, then the step of converting into the class having the first method call further comprises changing the position of the first synchronized block code, and if the code enclosed in the first synchronized block code includes code including a first method call to retrieve a thread-shared value while locking and a path to be executed if a predetermined value is returned as a result of the first method call, then the step of changing the position of the first synchronized block code includes the steps of:

deleting the first synchronized block code;

enclosing the path in a new synchronized block code; and
adding, to the code enclosed in the new synchronized block code, the code including the first method call to retrieve the thread-shared value while locking.

2. The method of claim 1, wherein the step of converting into the class having the first method call further comprises the step of:
converting the method call to the third class included in the first class, into the first method call that is a concurrent operation executable class having a functionality equivalent to that of the method call to the third class and having a shorter lock holding section than the third class.

3. The method of claim 2, wherein, if the code including the class having the first method call is enclosed in the first synchronized block code, then the step of converting into the class having the first method call further comprises the step of:
rewriting the code enclosed in the first synchronized block code.

4. The method of claim 1, wherein the thread-shared value is a value shared among threads, and the path includes two or more accesses to the instance variable or static variable of the concurrent operation executable class, and the step of changing the position of the first synchronized block code further includes the step of:
adding, to the code enclosed in the new synchronized block code, code including a statement to determine whether the return value of the first method call is the predetermined value.

5. The method of claim 3, wherein, if the code enclosed in the first synchronized block code involves two or more operations selected from the first method call to retrieve the thread-shared value, to read a private instance variable, and to read a private static variable, then the step of rewriting the code enclosed in the first synchronized block code further comprises the steps of:
replacing the first synchronized block code with a read block code; and
changing a write block code in which a command to update a variable to be referred to in the first method call or in the reading is enclosed, to code enclosed in another synchronized block code including the command to update the variable.

6. The method of claim 2, wherein, if the code including the class having the first method call satisfies a predetermined condition, then the step of converting into the class having the first method call further comprises the step of:
changing the code including the class having the first method call to code to atomically retrieve and update the thread-shared value.

7. The method of claim 1, wherein the step of converting into the class having the second method call further comprises the step of:
converting the method call to the parent class included in the second class, into the second method call that is a concurrent operation executable class having a functionality equivalent to that of the method call to the parent class and having a shorter lock holding section than the parent class.

8. The method of claim 7, wherein, if code including the class having the second method call is enclosed in a second synchronized block code, then the step of converting into the class having the second method call further comprises the steps of:
deleting the second synchronized block code; and
changing the position of the second synchronized block code.

9. The method of claim 7, wherein, if code including the class having the second method call is enclosed in the second synchronized block code, then the step of converting into the class having the second method call further comprises the step of:
rewriting the code enclosed in the second synchronized block code.

10. The method of claim 8, wherein the step of deleting the second synchronized block code is executed if the code enclosed in the second synchronized block code includes one or none of the second method call, and also does not include at least any one of an access to a static variable and an access to an instance variable other than an instance variable of the concurrent operation executable class.

11. The method of claim 8, wherein, if the code enclosed in the second synchronized block code includes code including a second method call to retrieve the thread-shared value while locking, and the path to be executed if a predetermined value is returned as a result of the second method call, and where the path includes two or more accesses to the instance variable or static variable of the concurrent operation executable class, then the step of changing the position of the second synchronized block code further includes the steps of:
deleting the second synchronized block code;
enclosing the path in another new synchronized block code; and
adding, to the code enclosed in the other new synchronized block code, the code including the second method call to retrieve the thread-shared value while locking, and including a statement to determine whether the return value of the second method call is the predetermined value.

12. The method of claim 9, wherein, if the code enclosed in the second synchronized block code involves two or more operations selected from the second method call to retrieve the thread-shared value, to read a private instance variable, and to read a private static variable, then the step of rewriting the code enclosed in the second synchronized block code further comprises the steps of:
replacing the second synchronized block code with a read block code; and
changing a write block code in which a command to update a variable to be referred to in the second method call or in the reading is enclosed, to code enclosed in another synchronized block code including the command to update the variable.

13. The method of claim 7, wherein, if code including the class having the second method call satisfies a predetermined condition, then the step of converting into the class having the second method call further comprises the step of:
changing the code including the class having the second method call to code to atomically retrieve and update the thread-shared value.

14. The method of claim 8, wherein the step of converting into the class having the second method call further comprises the steps of:
defining a method not defined in the class having the second method call but defined in the parent class, in the class having the second method call by using the same signature as that of the parent class; and
writing code to call the method defined in the class having the second method call, for implementation of the method defined with the same signature.

15. The method of claim 1, further comprising the steps of:
determining whether the first program code includes the first class having the method call to the third class using a thread-specific value as a key; and in response to the determination that the first program code includes the first class having the method call to the third class using the thread-specific value as the key, converting the first class into a class having a functionality equivalent to that of the third class and using a thread local value instead of the thread-specific value.

16. The method of claim 15, wherein the step of converting into the class using the thread local value further comprises the step of:
converting the method call to the third class using the thread-specific value as the key, into a method call to a thread local class having a functionality equivalent to the method call to the third class.

17. A computer system for executing a conversion computer program for converting a first program code in a multi-threaded program into a second program code which causes less lock contention, the computer system comprising:
a storage unit in which the first program code and the conversion computer program are stored; and
a central processing unit (CPU) configured for
loading the computer program, from the storage unit into a memory,
determining whether the first program code includes either (i) a first class having a method call to a class that operates while taking synchronization by locking, or (ii) a second class inheriting a parent class that operates while taking synchronization by locking,
converting the first class having the method call to a third class that operates while taking synchronization by locking into a class having a first method call to a concurrent operation executable fourth class that has a functionality equivalent to that of the third class and having a shorter lock holding section than the third class, and
converting the second class having a method call to the parent class into a class having a second method call to a concurrent operation executable class that has a functionality equivalent to that of the parent class and having a shorter lock holding section than the second class, wherein:
if code including the class having the second method call is enclosed in a synchronized block code, then the step of converting into the class having the second method call further comprises changing the position of the synchronized block code, and
if the code enclosed in the synchronized block code includes code including a second method call to retrieve a thread-shared value while locking and a path to be executed if a predetermined value is returned as a result of the second method call, then the step of changing the position of the synchronized block code includes the steps of:
deleting the synchronized block code;
enclosing the path in a new synchronized block code; and
adding, to the code enclosed in the new synchronized block code, the code including the second method call to retrieve the thread-shared value while locking.

18. The computer system of claim 17, wherein the CPU is further configured so that converting into the class having the first method call further comprises:
converting the method call to the third class included in the first class, into the first method call that is a concurrent operation executable class having a functionality equivalent to that of the method call to the third class and having a shorter lock holding section than the third class.

19. The computer system of claim 17, wherein, if code including the class having the first method call is enclosed in another synchronized block code, then the CPU is further configured so that converting into the first method call further comprises:
deleting the other synchronized block code; and
changing the position of the other synchronized block code.

20. The computer system of claim 17, wherein, if code including the class having the first method call is enclosed in another synchronized block code, then the CPU is further configured so that converting into the first method call further comprises:
rewriting the code enclosed in the other synchronized block code.

21. A non-transitory computer readable storage medium tangibly embodying computer readable instructions which when executed causes a computer to carry out the steps of the method for controlling data comprising the steps of:
determining whether the first program code includes either (i) a first class having a method call to a class that operates while taking synchronization by locking, or (ii) a second class inheriting a parent class that operates while taking synchronization by locking;
in response to the determination that the first program code includes the first class, converting the first class having the method call to a third class that operates while taking synchronization by locking, into a class having a first method call to a concurrent operation executable fourth class that has a functionality equivalent to that of the third class, and having a shorter lock holding section than the third class; and
in response to the determination that the first program code includes the second class, converting the second class having a method call to the parent class, into a class having a second method call to a concurrent operation executable class that has a functionality equivalent to that of the parent class, and having a shorter lock holding section than the second class, wherein:
if code including the class having the first method call or the class having the second method call is enclosed in a synchronized block code, then the step of converting into the class having the first method call or converting into the class having the second method call further comprises rewriting the code enclosed in the synchronized block code, and
if the code enclosed in the synchronized block code involves two or more operations selected from the first method call or the second method call to retrieve the thread-shared value, to read a private instance variable, and to read a private static variable, then the step of rewriting the code enclosed in the synchronized block code further comprises the steps of:
replacing the synchronized block code with a read block code; and
changing a write block code in which a command to update a variable to be referred to in the first or the second method call or in the reading is enclosed, to code enclosed in another synchronized block code including the command to update the variable.

* * * * *